(12) United States Patent
Blumrich et al.

(10) Patent No.: US 8,103,910 B2
(45) Date of Patent: Jan. 24, 2012

(54) LOCAL ROLLBACK FOR FAULT-TOLERANCE IN PARALLEL COMPUTING SYSTEMS

(75) Inventors: Matthias A. Blumrich, Yorktown Heights, NY (US); Dong Chen, Yorktown Heights, NY (US); Alan Gara, Yorktown Heights, NY (US); Mark E. Giampapa, Yorktown Heights, NY (US); Philip Heidelberger, Yorktown Heights, NY (US); Martin Ohmacht, Yorktown Heights, NY (US); Burkhard Steinmacher-Burow, Boeblingen (DE); Krishnan Sugavanam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/696,780

(22) Filed: Jan. 29, 2010

(65) Prior Publication Data
US 2011/0119526 A1  May 19, 2011

Related U.S. Application Data

(60) Provisional application No. 61/295,669, filed on Jan. 15, 2010, provisional application No. 61/293,611, filed on Jan. 8, 2010, provisional application No. 61/261,269, filed on Nov. 13, 2009.

(51) Int. Cl.
*G06F 11/00* (2006.01)
(52) U.S. Cl. ....................................................... 714/19
(58) Field of Classification Search ...................... 714/19
See application file for complete search history.

(56) References Cited

U.S. PATENT DOCUMENTS

| 6,519,730 | B1 | 2/2003 | Ando et al. |
| 6,779,087 | B2* | 8/2004 | Saulsbury et al. ............ 711/143 |
| 6,950,908 | B2 | 9/2005 | Shibayama et al. |
| 7,093,086 | B1* | 8/2006 | van Rietschote ............ 711/161 |
| 7,117,391 | B1* | 10/2006 | Hornick et al. ................. 714/15 |
| 7,350,027 | B2 | 3/2008 | Gara et al. |
| 7,373,548 | B2* | 5/2008 | Reinhardt et al. .............. 714/13 |
| 7,516,361 | B2* | 4/2009 | Vick et al. ...................... 714/15 |
| 7,571,347 | B2* | 8/2009 | Gross et al. ..................... 714/15 |
| 7,644,300 | B1* | 1/2010 | Rao .................................. 714/5 |
| 7,870,369 | B1* | 1/2011 | Nelson et al. ................ 712/220 |
| 7,877,630 | B1* | 1/2011 | Favor et al. .................... 714/20 |

(Continued)

OTHER PUBLICATIONS

"Overview of the IBM Blue Gene/P project" IBM Blue Gene Team, IBM Journal of Research and Development, Jan. 2008, pp. 199-220, vol. 52, Issue 1/2.

(Continued)

*Primary Examiner* — Robert Beausoliel, Jr.
*Assistant Examiner* — Neil Miles
(74) *Attorney, Agent, or Firm* — Scully, Scott, Murphy & Presser, P.C.; Daniel P. Morris, Esq.

(57) ABSTRACT

A control logic device performs a local rollback in a parallel super computing system. The super computing system includes at least one cache memory device. The control logic device determines a local rollback interval. The control logic device runs at least one instruction in the local rollback interval. The control logic device evaluates whether an unrecoverable condition occurs while running the at least one instruction during the local rollback interval. The control logic device checks whether an error occurs during the local rollback. The control logic device restarts the local rollback interval if the error occurs and the unrecoverable condition does not occur during the local rollback interval.

16 Claims, 13 Drawing Sheets

U.S. PATENT DOCUMENTS

| | | | |
|---|---|---|---|
| 2002/0174379 A1* | 11/2002 | Korenevsky et al. | 714/19 |
| 2004/0039962 A1* | 2/2004 | Ganesh et al. | 714/16 |
| 2005/0050386 A1* | 3/2005 | Reinhardt et al. | 714/13 |
| 2005/0120179 A1* | 6/2005 | Akkary et al. | 711/126 |
| 2006/0112261 A1* | 5/2006 | Yourst et al. | 712/218 |
| 2006/0168473 A1* | 7/2006 | Sahoo et al. | 714/15 |
| 2007/0180317 A1* | 8/2007 | Hirotsu et al. | 714/17 |
| 2007/0245128 A1* | 10/2007 | Gray et al. | 712/214 |
| 2008/0244186 A1* | 10/2008 | Bose et al. | 711/135 |
| 2008/0288819 A1* | 11/2008 | Heller, Jr. | 714/19 |
| 2009/0217020 A1* | 8/2009 | Yourst | 712/245 |
| 2010/0017655 A1* | 1/2010 | Gooding et al. | 714/16 |

OTHER PUBLICATIONS

Garzaran, M. J., et al., "Tradeoffs in buffering speculative memory state for thread-level speculation in multiprocessors", ACM Transactions on Architecture and Code Optimization (TACO), Sep. 2005, pp. 247-279, vol. 2, Issue 3.

* cited by examiner

LOCAL ROLLBACK FOR FAULT-TOLERANCE IN PARALLEL COMPUTING SYSTEMS

CROSS-REFERENCE TO RELATED APPLICATIONS

This application claims the benefit of U.S. patent application Ser. No. 61/261,269, filed Nov. 13, 2009 for "LOCAL ROLLBACK FOR FAULT-TOLERANCE IN PARALLEL COMPUTING SYSTEMS"; U.S. patent application Ser. No. 61/293,611, filed Jan. 8, 2010 for "A MULTI-PETASCALE HIGHLY EFFICIENT PARALLEL SUPERCOMPUTER"; and U.S. patent application Ser. No. 61/295,669, filed Jan. 15, 2010 for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT", the entire content and disclosure of each of which is incorporated herein by reference; and is related to the following commonly-owned, co-pending United States patent applications, the entire contents and disclosure of each of which is expressly incorporated by reference herein as if fully set forth herein: U.S. patent application Ser. No. 12/684,367, filed Jan. 8, 2010, for "USING DMA FOR COPYING PERFORMANCE COUNTER DATA TO MEMORY"; U.S. patent application Ser. No. 12/684,172, filed Jan. 8, 2010 for "HARDWARE SUPPORT FOR COLLECTING PERFORMANCE COUNTERS DIRECTLY TO MEMORY"; U.S. patent application Ser. No. 12/684,190, filed Jan. 8, 2010 for "HARDWARE ENABLED PERFORMANCE COUNTERS WITH SUPPORT FOR OPERATING SYSTEM CONTEXT SWITCHING"; U.S. patent application Ser. No. 12/684,496, filed Jan. 8, 2010 for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, for "HARDWARE SUPPORT FOR SOFTWARE CONTROLLED FAST MULTIPLEXING OF PERFORMANCE COUNTERS"; U.S. patent application Ser. No. 12/697,799, for "CONDITIONAL LOAD AND STORE IN A SHARED CACHE"; U.S. patent application Ser. No. 12/684,738, filed Jan. 8, 2010, for "DISTRIBUTED PERFORMANCE COUNTERS"; U.S. patent application Ser. No. 12/684,860, filed Jan. 8, 2010, for "PAUSE PROCESSOR HARDWARE THREAD ON PIN"; U.S. patent application Ser. No. 12/684,174, filed Jan. 8, 2010, for "PRECAST THERMAL INTERFACE ADHESIVE FOR EASY AND REPEATED, SEPARATION AND REMATING"; U.S. patent application Ser. No. 12/684,184, filed Jan. 8, 2010, for "ZONE ROUTING IN A TORUS NETWORK"; U.S. patent application Ser. No. 12/684,852, filed Jan. 8, 2010, for "PROCESSOR RESUME UNIT"; U.S. patent application Ser. No. 12/684,642, filed Jan. 8, 2010, for "TLB EXCLUSION RANGE"; U.S. patent application Ser. No. 12/684,804, filed Jan. 8, 2010, for "DISTRIBUTED TRACE USING CENTRAL PERFORMANCE COUNTER MEMORY"; U.S. patent application Ser. No. 61/293,237, filed Jan. 8, 2010, for "ORDERING OF GUARDED AND UNGUARDED STORES FOR NO-SYNC I/O"; U.S. patent application Ser. No. 12/693,972, filed Jan. 26, 2010, for "DISTRIBUTED PARALLEL MESSAGING FOR MULTIPROCESSOR SYSTEMS"; U.S. patent application Ser. No. 12/688,747, filed Jan. 15, 2010, for "Support for non-locking parallel reception of packets belonging to the same reception FIFO"; U.S. patent application Ser. No. 12/688,773, filed Jan. 15, 2010, for "OPCODE COUNTING FOR PERFORMANCE MEASUREMENT"; U.S. patent application Ser. No. 12/684,776, filed Jan. 8, 2010, for "MULTI-INPUT AND BINARY REPRODUCIBLE, HIGH BANDWIDTH FLOATING POINT ADDER IN A COLLECTIVE NETWORK"; U.S. patent application Ser. No. 12/984,252, for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 13/008,502, for "MEMORY SPECULATION IN A MULTI LEVEL CACHE SYSTEM"; U.S. patent application Serial No. 13/008,583, for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 12/984,308, for "MINIMAL FIRST LEVEL CACHE SUPPORT FOR MEMORY SPECULATION MANAGED BY LOWER LEVEL CACHE"; U.S. patent application Ser. No. 12/984,329, for "PHYSICAL ADDRESS ALIASING TO SUPPORT MULTI-VERSIONING IN A SPECULATION-UNAWARE CACHE"; U.S. patent application Ser. No. 61/293,552, filed Jan. 8, 2010, for "LIST BASED PREFETCH"; U.S. patent application Ser. No. 12/684,693, filed Jan. 8, 2010, for "PROGRAMMABLE STREAM PREFETCH WITH RESOURCE OPTIMIZATION"; U.S. patent application Ser. No. 61/293,494, filed Jan. 8, 2010, for "NON-VOLATILE MEMORY FOR CHECKPOINT STORAGE"; U.S. patent application Ser. No. 61/293,476, filed Jan. 8, 2010, for "NETWORK SUPPORT FOR SYSTEM INITIATED CHECKPOINTS"; U.S. patent application Ser. No. 61/293,554, filed Jan. 8, 2010, for "TWO DIFFERENT PREFETCHING COMPLEMENTARY ENGINES OPERATING SIMULTANEOUSLY"; U.S. patent application Ser. No. 12/697,015, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, filed Jan. 8, 2010, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 61/293,569, filed Jan. 8, 2010, for "IMPROVING THE EFFICIENCY OF STATIC CORE TURNOFF IN A SYSTEM-ON-A-CHIP WITH VARIATION"; U.S. patent application Ser. No. 12/697,043, for "IMPLEMENTING ASYNCHRONOUS COLLECTIVE OPERATIONS IN A MULTI-NODE PROCESSING SYSTEM"; U.S. patent application Ser. No. 13/008,546, for "MULTIFUNCTIONING CACHE"; U.S. patent application Ser. No. 12/697,175 for "I/O ROUTING IN A MULTIDIMENSIONAL TORUS NETWORK"; U.S. patent application Ser. No. 12/684,287, filed Jan. 8, 2010 for "ARBITRATION IN CROSSBAR INTERCONNECT FOR LOW LATENCY"; U.S. patent application Ser. No. 12/684,630, filed Jan. 8, 2010 for "EAGER PROTOCOL ON A CACHE PIPELINE DATAFLOW"; U.S. patent application Ser. No. (YOR920090648US1 (24876)) for "EMBEDDING GLOBAL BARRIER AND COLLECTIVE IN A TORUS NETWORK"; U.S. patent application Ser. No. 61/293,499, filed Jan. 8, 2010 for "GLOBAL SYNCHRONIZATION OF PARALLEL PROCESSORS USING CLOCK PULSE WIDTH MODULATION"; U.S. patent application Ser. No. 61/293,266, filed Jan. 8, 2010 for "IMPLEMENTATION OF MSYNC"; U.S. patent application Ser. No. 12/796,389 for "NON-STANDARD FLAVORS OF MSYNC"; U.S. patent application Ser. No. 12/696,817 for "HEAP/STACK GUARD PAGES USING A WAKEUP UNIT"; U.S. patent application Ser. No. 61/293,603, filed Jan. 8, 2010 for "MECHANISM OF SUPPORTING SUB-COMMUNICATOR COLLECTIVES WITH O(64) COUNTERS AS OPPOSED TO ONE COUNTER FOR EACH SUB-COMMUNICATOR"; and U.S. patent application Ser. No. 12/774, 475 for "REPRODUCIBILITY IN A MULTIPROCESSOR SYSTEM.".

GOVERNMENT CONTRACT

This invention was Government support under Contract No. B554331 awarded by Department of Energy. The Government has certain rights in this invention.

BACKGROUND

The invention relates to improving the reliability and availability of highly parallel computing systems.

Highly parallel computing systems, with tens to hundreds of thousands of nodes, are potentially subject to a reduced mean-time-to-failure (MTTF) due to a soft error on one of the nodes. This is particularly true in HPC (High Performance Computing) environments running scientific jobs. Such jobs are typically written in such a way that they query how many nodes (or processes) N are available at the beginning of the job and the job then assumes that there are N nodes available for the duration of the run. A failure on one node causes the job to crash. To improve availability such jobs typically perform periodic checkpoints by writing out the state of each node to a stable storage medium such as a disk drive. The state may include the memory contents of the job (or a subset thereof from which the entire memory image may be reconstructed) as well as program counters. If a failure occurs, the application can be rolled-back (restarted) from the previous checkpoint on a potentially different set of hardware with N nodes.

However, on machines with a large number of nodes and a large amount of memory per node, the time to perform such a checkpoint to disk may be large, due to limited I/O bandwidth from the HPC machine to disk drives. Furthermore, the soft error rate is expected to increase due to the large number of transistors on a chip and the shrinking size of such transistors as technology advances.

To cope with such software, processor cores and systems increasingly rely on mechanisms such as Error Correcting Codes (ECC) and instruction retry to turn otherwise non-recoverable soft errors into recoverable soft errors. However, not all soft errors can be recovered in such a manner, especially on very small, simple cores that are increasingly being used in large HPC systems such as BlueGene/Q (BG/Q).

What is needed then is an approach to recover from a large fraction of soft errors without resorting to complete checkpoints. If this can be accomplished effectively, the frequency of checkpoints can be reduced without sacrificing availability.

SUMMARY

This disclosure teaches a technique for doing "local rollbacks" by utilizing a multi-versioned memory system such as that on BlueGene/Q. On BG/Q, the level 2 cache memory (L2) is multi-versioned to support both speculative running, a transactional memory model, as well as a rollback mode. Data in the L2 may thus be speculative. On BG/Q, the L2 is partitioned into multiple L2 slices, each of which acts independently. In speculative or transactional mode, data in the main memory is always valid, "committed" data and speculative data is not written back to the main memory. In rollback mode, speculative data may be written back to the main memory, at which point it cannot be distinguished from committed data. In this invention, we focus on the hardware capabilities of the L2 to support local rollbacks. That capability is somewhat different than the capability to support speculative running and transactional memory. This invention shows how to use this multi-versioned cache to improve reliability. Briefly, in addition to supporting common caching functionality, the L2 on BG/Q includes the following features for running in rollback mode. The same line (128 bytes) of data may exist multiple times in the cache. Each such line has a generation id tag and there is an ordering mechanism such that tags can be ordered from oldest to newest. There is a mechanism for requesting and managing new tags, and for "scrubbing" the L2 to clean it of old tags.

DETAILED DESCRIPTION

IBM® Blue Gene®/Q ("BG/Q") supercomputer system is a third generation massively parallel supercomputer. It uses Blue Gene® architecture 800 shown in FIG. 8) with fifteen times faster or more throughput rate than Blue Gene®/P per dual-midplane rack, but with several novel enhancements which will be described below. Previous generations of Blue Gene® (e.g., Blue Gene®/L and Blue Gene®/P) are described in "Special Double Issue on Blue Gene", IBM® Journal of Research and Development, Vol. 49, Number 2/3, March/May 2005, wholly incorporated by reference as if set forth herein, and IBM® Journal of Research and Development, Vol. 52, 49, Numbers 1 and 2, January/March 2008, pp. 199-219, wholly incorporated by reference as if set forth herein. The system is expandable to 512 compute racks, each with 1024 compute node ASICs (BQC) containing 16 PowerPC A2 processor cores for running application code at 1600 MHz. Each A2 core has associated a quad-wide fused multiply-add SIMD floating point unit, producing 8 double precision operations per cycle, for a total of 128 floating point operations per cycle per computer chip. Cabled as a single system, the multiple racks can be partitioned into smaller systems by programming switch chips, termed the BG/Q Link ASICs (BQL), which source and terminate the optical cables between midplanes.

Each compute rack consists of 2 sets of 512 computing nodes. Each set is packaged around a doubled-sided backplane, or midplane, which supports a five-dimensional torus of size 4×4×4×4×2 which is the communication network for the computing nodes which are packaged on 16 node boards. This tori network can be extended in 4 dimensions through link chips on the node boards, which redrive the signals optically with an architecture limit of 64 to any torus dimension. The signaling rate is 10 Gb/s, 8/10 encoded), over ~20 meter multi-mode optical cables at 850 nm. As an example, a 96-rack system is connected as a 16×16×16×12×2 torus, with the last ×2 dimension contained wholly on the midplane. For reliability reasons, small torus dimensions of 8 or less may be run as a mesh rather than a torus with minor impact to the aggregate messaging rate.

2. Major System Components

The Blue Gene/Q platform contains four kinds of nodes: computing nodes (CN), I/O nodes (ION), login nodes (LN), and service nodes (SN). The CN and ION share the same Blue Gene/Q compute ASIC. Hence, we describe CNs and IONs together in this section. Blue Gene/Q and its predecessors (Blue Gene/L and Blue Gene/P) use homogeneous general purpose computing cores.

Figure 8:
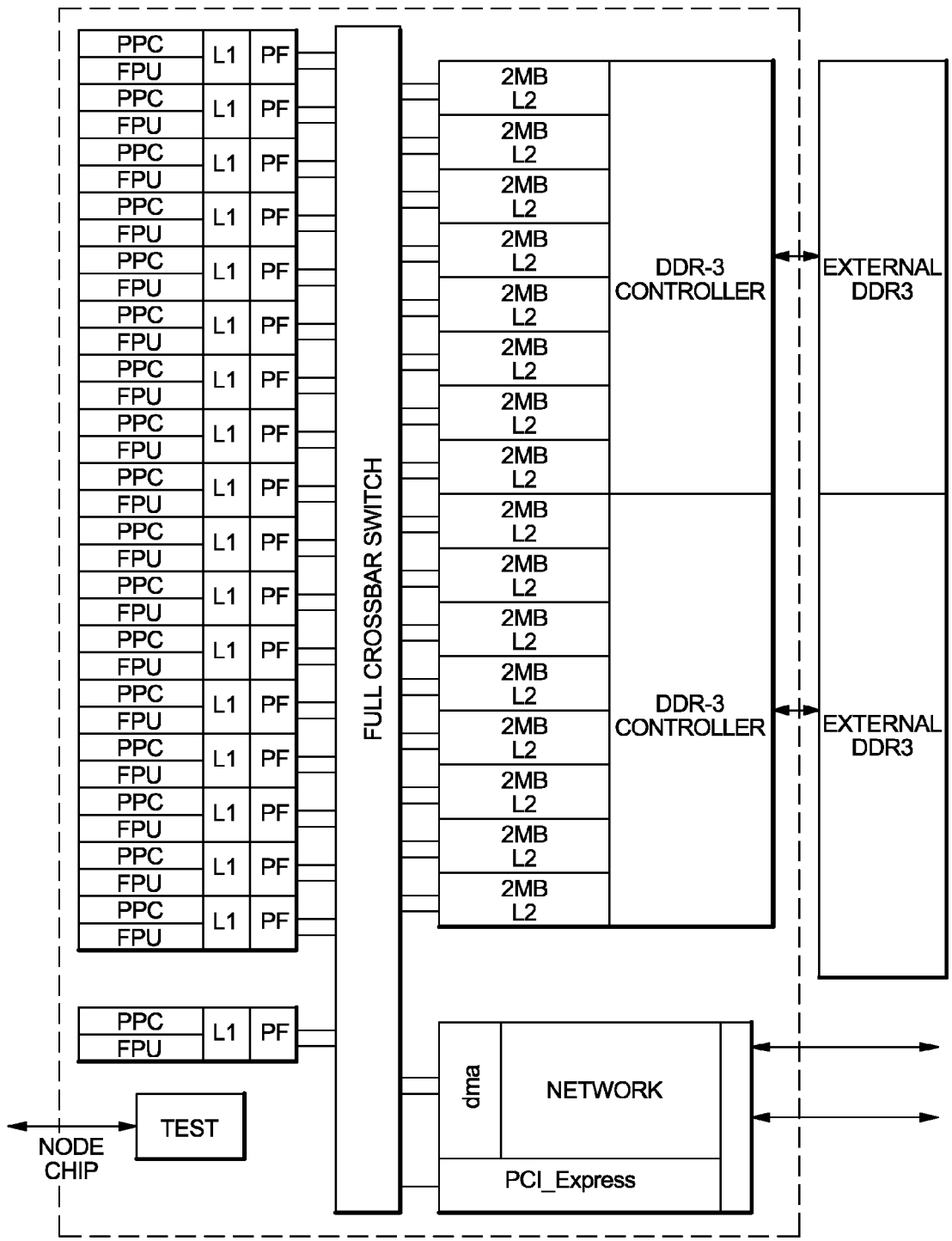
FIG. 8 illustrates a parallel super computing architecture in one embodiment.
Figure 9:
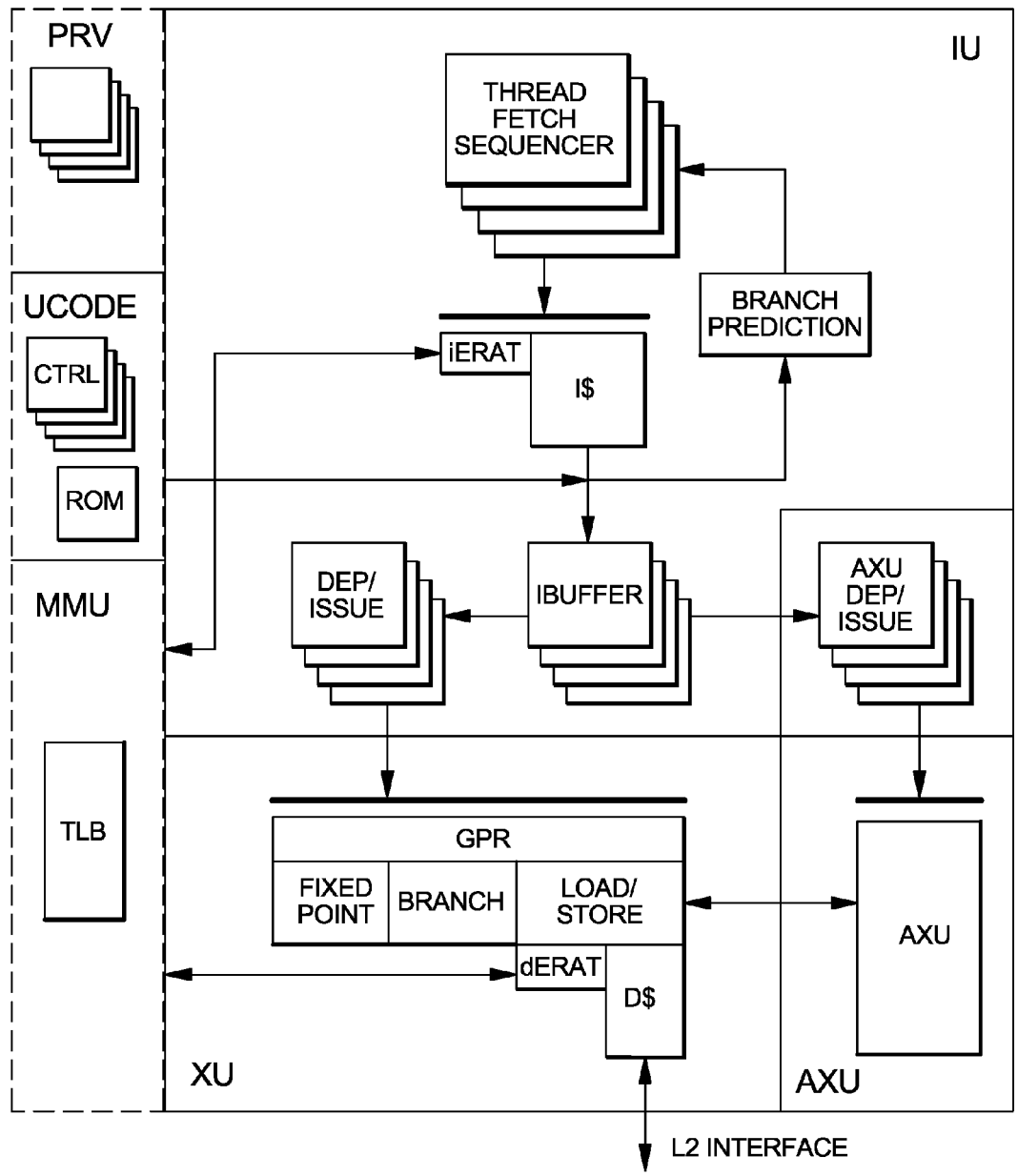
FIG. 9 illustrates BQC processor core (A2 core) in one embodiment.

2a. Microprocessor Core and Quad Floating Point Unit of CN and ION:

The basic node of this present massively parallel supercomputer architecture is illustrated in FIG. 8. The node here is based on a low power A2 PowerPC cores, though the architecture can use any low power cores. The A2 is a 4-way multi-threaded 64 b PowerPC implementation. Each A2 core has its own calculation unit (XU), instruction unit (IU), and quad floating point unit (QPU) connected via the AXU (Auxiliary Calculation Unit) (FIG. 9). The QPU is an implementation of the 4-way SIMD QPX floating point instruction set architecture. QPX is an extension of the scalar PowerPC floating point architecture. It defines 32 32 B-wide floating point registers per thread instead of the traditional 32 scalar 8 B-wide floating point registers. Each register contains 4 slots, each slot storing an 8 B double precision floating point number. The leftmost slot corresponds to the traditional scalar floating point register. The standard PowerPC floating point instructions operate on the left-most slot to preserve the scalar semantics as well as in many cases also on the other three slots. Programs that are assuming the traditional FPU ignore the results generated by the additional three slots. QPX defines, in addition to the traditional instructions new load, store, arithmetic instructions, rounding, conversion, compare and select instructions that operate on all 4 slots in parallel and deliver 4 double precision floating point results concurrently. The load and store instructions move 32 B from and to main memory with a single instruction. The arithmetic instructions include addition, subtraction, multiplication, various forms of multiply-add as well as reciprocal estimates and reciprocal square root estimates.

2b. Compute ASIC Node (BQC):

The computer chip implements 18 PowerPC compliant A2 cores and 18 attached QPU floating point units. At least 17 cores are functional. The 18th "redundant" core is in the design to improve chip yield. Of the 17 functional units, 16 will be used for computation leaving one to be reserved for system function.

2c. I/O Node:

Besides the 1024 BQC compute nodes per rack, there are associated BQC I/O nodes, These I/O nodes are in separate racks, and are connected to the compute nodes through an 11th port (the I/O port). The I/O nodes are themselves connected in a 5D torus with an architectural limit. I/O nodes contain an associated PCIe 2.0 adapter card, and can exist either with compute nodes in a common midplane, or as separate I/O racks connected optically to the compute racks; the difference being the extent of the torus connecting the nodes. The SN and FENs are accessed through an Ethernet control network. For this installation the storage nodes are connected through a large IB (InfiniBand) switch to I/O nodes.

2d. Memory Hierarchy—L1 and L1P:

The QPU has a 32 B wide data path to the L1-cache of the A2, allowing it to load or store 32 B per cycle from or into the L1-cache. Each core is directly connected to a prefetch unit (level-1 prefetch, L1P), which accepts, decodes and dispatches all requests sent out by the A2. The store interface from the A2 to the L1P is 32 B wide and the load interface is 16 B wide, both operating at processor frequency. The L1P implements a fully associative, 32 entry prefetch buffer. Each entry can hold an L2 line of 128 B size.

The L1P provides two prefetching schemes: a sequential prefetcher as used in previous Blue Gene architecture generations, as well as a novel list prefetcher. The list prefetcher tracks and records memory requests, sent out by the core, and writes the sequence as a list to a predefined memory region. It can replay this list to initiate prefetches for repeated sequences of similar access patterns. The sequences do not have to be identical, as the list processing is tolerant to a limited number of additional or missing accesses. This automated learning mechanism allows a near perfect prefetch behavior for a set of important codes that show the access behavior, as well as perfect prefetch behavior for codes that allow precomputation of the access list.

Figure 10:
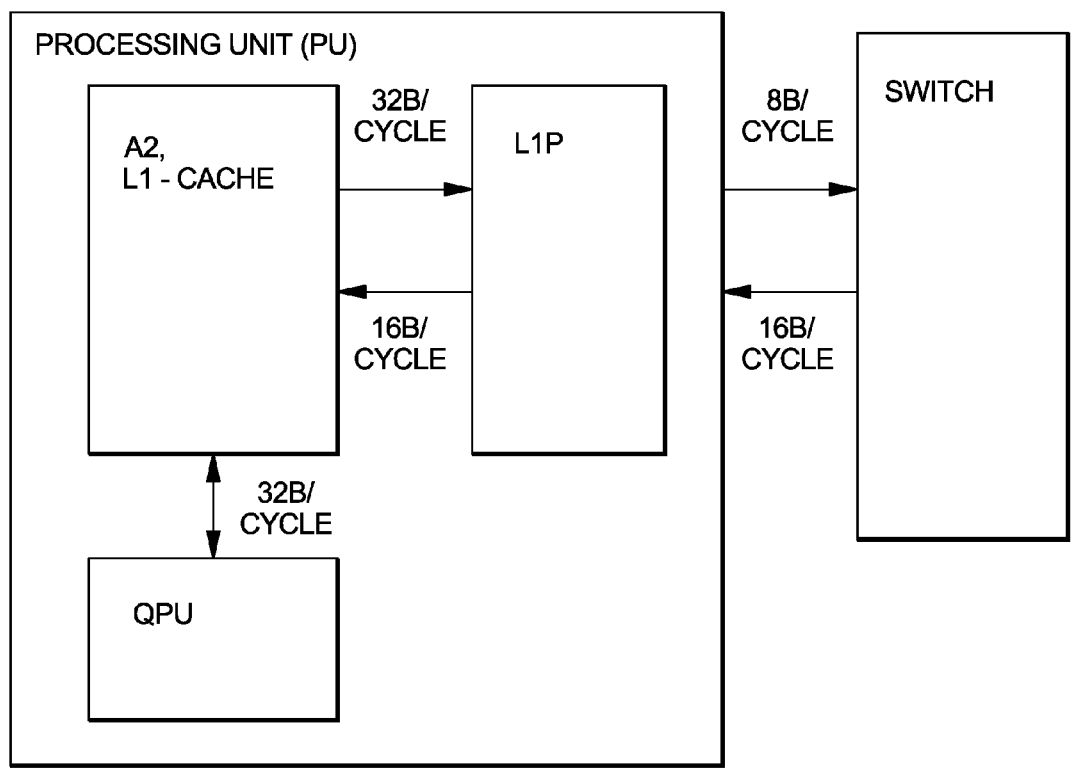
FIG. 10 illustrates processing unit components and connectivity in one embodiment.

2e. Processing Unit:

The complex consisting of A2, QPU and L1P is called processing unit (PU, see FIG. 10). Each PU connects to the central low latency, high bandwidth crossbar switch via a master port. The central crossbar routes requests and write data from the master ports to the slave ports and read return data back to the masters. The write data path of each master and slave port is 16 B wide. The read data return port is 32 B wide.

Figure 11:
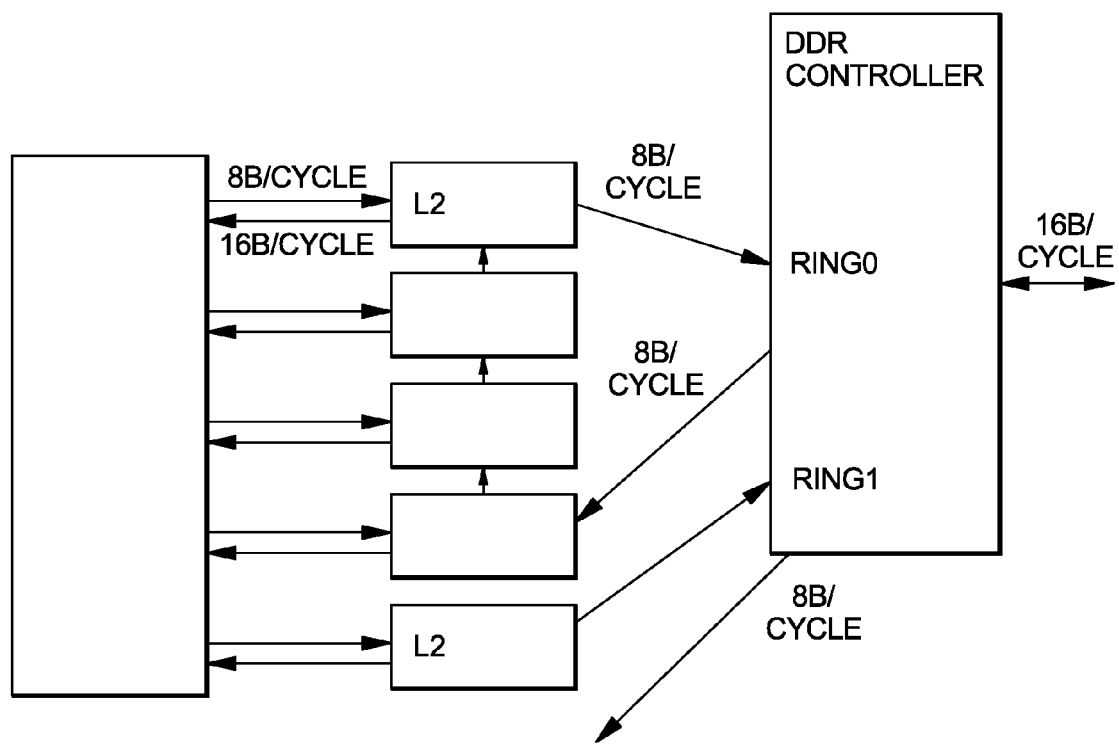
FIG. 11 illustrates an L2 cache memory device and DDR controller in one embodiment.
Figure 12:
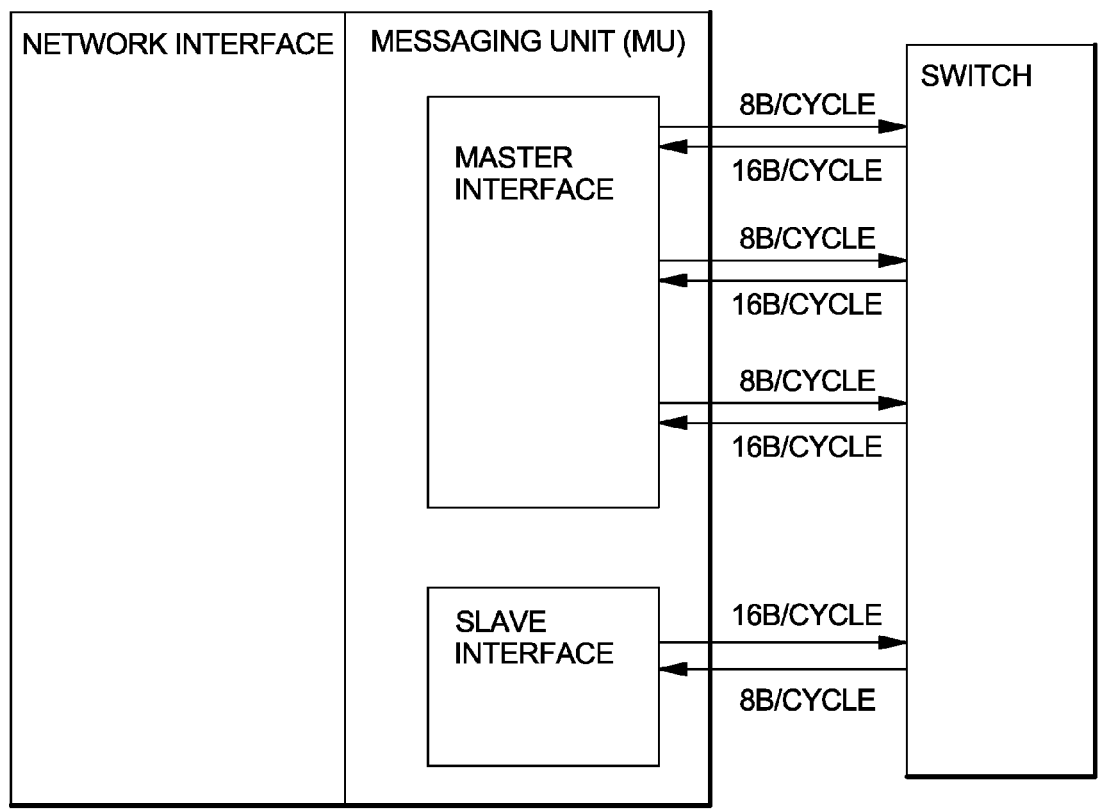
FIG. 12 illustrates a network interface and DMA (Direct Memory Access) in one embodiment.

2f. L2 Cache Memory Device ("L2 Cache"):

The 32 MiB shared L2 cache (as shown in FIG. 11) is sliced into 16 units, each connecting to a slave port of the switch. Every physical address is mapped to one slice using a selection of programmable address bits or a XOR-based hash across all address bits. The L2-cache slices, the L1Ps and the L1-D caches of the A2s are hardware-coherent. A group of 4 slices is connected via a ring to one of the two DDR3 SDRAM controllers. Each of the four rings is 16 B wide and clocked at half processor frequency. The SDRAM controllers drive each a 16 B wide SDRAM port at 1333 or 1600 Mb/s/pin. The SDRAM interface uses an ECC across 64 B with chip-kill correct capability. Both the chip-kill capability and direct soldered DRAMs and enhanced error correction codes, are used to achieve ultra reliability targets.

The BGQ Compute ASIC incorporates support for thread-level speculative running (TLS). This support utilizes the L2 cache to handle multiple versions of data and detect memory reference patterns from any core that violates sequential consistency. The L2 cache design tracks all loads to cache a cache line and checks all stores against these loads. This BGQ compute ASIC has up to 32 MiB of speculative running state storage in L2 cache. The design supports for the following speculative running mechanisms. If a core is idle and the system is running in a speculative mode, the target design provides a low latency mechanism for the idle core to obtain a speculative work item and to cancel that work and invalidate its internal state and obtain another available speculative work item if sequential consistency is violated. Invalidating internal state is extremely efficient: updating a bit in a table that indicates that the thread ID is now in the "Invalid" state. Threads can have one of four states: Primary non-speculative; Speculative, valid and in progress; Speculative, pending completion of older dependencies before committing; and Invalid, failed.

2g. Atomics:

Cores can communicate via loads and stores from and to the shared memory. This supercomputer supports three methods of providing atomicity for memory updates:

It implements reservations and conditional stores as defined in the PowerPC architecture.

It implements a set of operations that are run atomically directly by the memory subsystem. The set of operations includes the following: add to memory; increment memory and return previous value; increment memory if memory value unequal to secondary memory location and return failure to increment or old value. These operations are activated via loads and stores to a special address space and can be applied to any location of the architected 64 GiB main memory address space. The throughput achievable for operations returning values is one operation every 4 processor cycles and for operations not delivering a return value to the core one operation every 2 processor cycles.

The multi-versioning cache of this supercomputer supports transactional memory directly in hardware. A sequence of memory operations can be grouped as a transaction and guaranteed to either be run atomically by the memory subsystem or reverted in ease of a conflict with other memory accesses or transactions. The BQC Compute ASIC incorporates support for ordered and unordered transactional memory operations. In the transactional memory model, the user defines those regions of code through annotations that are to be handled as atomic. The hardware support utilizes the same mechanisms implemented in the L2 cache as the speculative run. In addition to multi-version support, the L2 cache tracks and checks for transaction memory all loads against all stores as well as all stores against stores to a cache line. Like for speculative running, the Blue Gene®/Q compute ASIC can hold up to 32 MiB of transactional memory state in the L2 cache. If there is a violation of atomicity detected by the hardware, an interrupt is presented to the appropriate core. This interrupt will result in the section of code associated with the atomic update being rerun. The hardware will insure for this violation case that all state generated during the failed atomic update will be discarded.

Communication between the cores on the compute node includes traditional core-to-core interrupts that allow other threads on arbitrary cores to be notified within a deterministic low latency. To achieve this, the computer chip implements a dedicated on-chip interrupt network. This network is also used to control a novel wake-up mechanism. Threads that are waiting for an event can be sent into a sleep mode in which they do not to use resources shared with other threads and also consume less power. The wake-up mechanism causes this sleep mode to be exited with very low latency and the thread to immediately start processing the event it has been waiting for. This operation resumes running much faster than even entering the exception handler for a regular interrupt.

2h. Message Unit

The computer chip implements a direct memory access engine (Messaging Unit, MU) to offload the network interface. It transfers blocks via three switch master ports between the L2-caches and the reception and transmission FIFOs of the network interface. It is controlled by the cores via memory mapped I/O access through an additional switch slave port.

Figure 13:
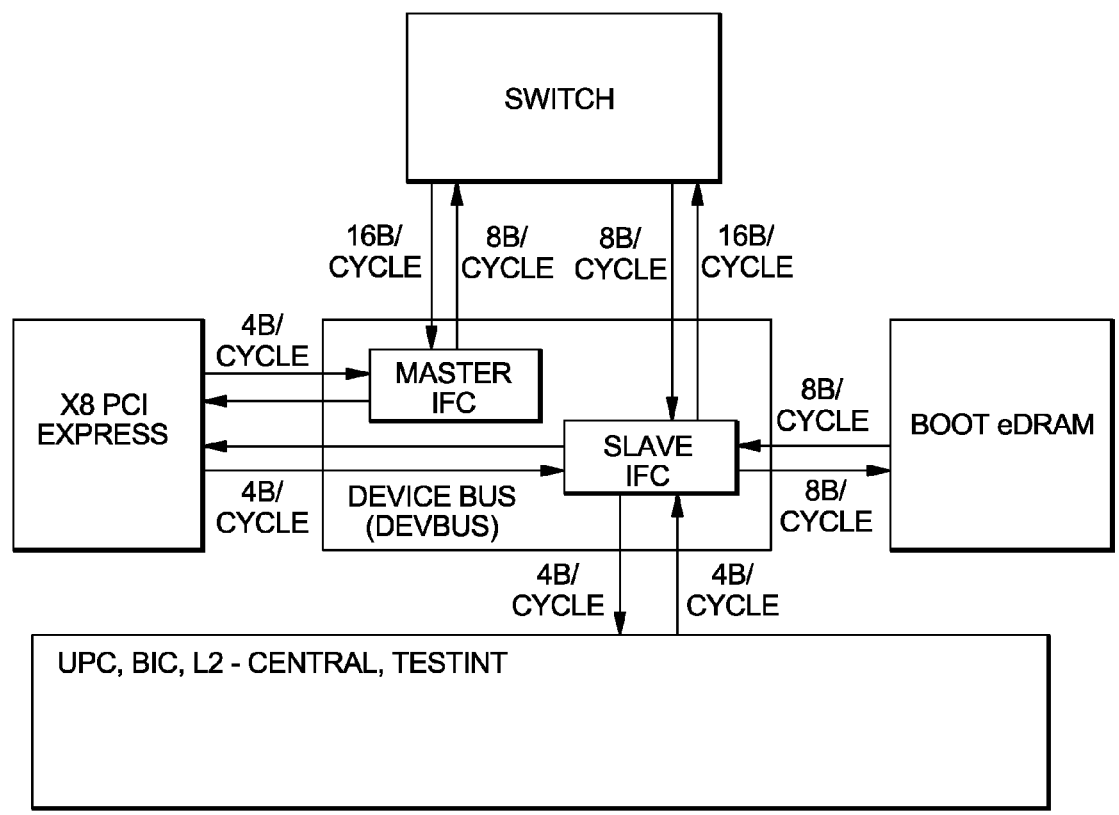
FIG. 13 illustrates device bus unit (DEVBUS) connected to the crossbar switch.

2i. All other devices accessed by the core or requiring direct memory access are connected via the device bus unit (DEV-BUS) to the crossbar switch as shown in FIG. 13. The PCI express interface unit uses this path to enable PCIe devices to DMA data into main memory via the L2 caches. The DEV-BUS switches requests from its slave port also to the boot eDRAM, an on-chip memory used for boot, RAS messaging and control-system background communication. Other units accessible via DEVBUS include the universal performance counter unit (UPC), the interrupt controller (BIC), the test controller/interface (TESTINT) as well as the global L2 state controller (L2-central).

3. BGQ System Packaging

Each compute rack contains 2 midplanes, and each midplane contains 512 16-way PowerPC A2 compute processors, each on a compute ASIC Midplanes are arranged vertically in the rack, one above the other, and are accessed from the front and rear of the rack. Each midplane has its own bulk power supply and line cord. These same racks also house I/O boards.

Each passive compute midplane contains 16 node boards, each with 32 compute ASICs and 9 Blue Gene/Q Link ASICs, and a service card that provides clocks, a control buss, and power management. An I/O midplane may be formed with 16 I/O boards replacing the 16 node boards. An I/O board contains 8 compute ASICs, 8 link chips, and 8 PGI2 2.0 adapter card slots.

The midplane, the service card, the node (or I/O) boards, as well as the compute, and direct current assembly (DCA) cards that plug into the I/O and node boards are described here. The BQC chips are mounted singly, on small cards with up to 72 (36) associated SDRAM-DDR3 memory devices (in the preferred embodiment, 64 (32) chips of 2 Gb SDRAM constitute a 16 (8) GB node, with the remaining 8 (4) SDRAM chips for chipkill implementation.) Each node board contains 32 of these cards connected in a 5 dimensional array of length 2 ($2^5=32$). The fifth dimension exists on the node board, connecting pairs of processor chips. The other dimensions are used to electrically connect 16 node boards through a common midplane forming a 4 dimensional array of length 4; a midplane is thus $4^4 \times 2 = 512$ nodes. Working together, 128 link chips in a midplane extend the 4 midplane dimensions via optical cables, allowing midplanes to be connected together. The link chips can also be used to space partition the machine into sub-tori partitions; a partition is associated with at least one I/O node and one user program is allowed to operate per partition. The 10 torus directions are referred to as the +/−a, +/−b, +/−c, +/−d, +/−e dimensions. The electrical signaling rate is 4 Gb/s and a torus port is 4 bits wide per direction, for an aggregate bandwidth of 2 GB/s per port per direction. The 5-dimenstional torus links are bidirectional. We have the raw aggregate link bandwidth of 2 GB/s*2*10=40 GB/s. The raw hardware Bytes/s:FLOP/s is thus 40:204.8=0.195. The link chips double the electrical datarate to 8 Gb/s, add a layer of encoding (8 b/10 b+parity), and drive directly the Tx and Rx optical modules at 10 GB/s. Each port has 2 fibers for send and 2 for receive. The Tx+Rx modules handle 12+12 fibers, or 4 uni-directional ports, per pair, including spare fibers. Hardware and software work together to seamlessly change from a failed optical fiber link, to a spare optical fiber link, without application fail.

The BQC ASIC contains a PCIe 2.0 port of width 8 (8 lanes). This port, which cannot be subdivided, can send and receive data at 4 GB/s (8/10 encoded to 5 GB/s). It shares pins with the fifth (+/−e) torus ports. Single node compute cards can become single node I/O cards by enabling this adapter card port. Supported adapter cards include IB-QDR and dual 10 Gb Ethernet. Compute nodes communicate to I/O nodes over an I/O port, also 2+2 GB/s. Two compute nodes, each with an I/O link to an I/O node, are needed to fully saturate the PCIe bus. The I/O port is extended optically, through a $9^{th}$ link chip on a node board, which allows compute nodes to communicate to I/O nodes on other racks. I/O nodes in their own racks communicate through their own 3 dimensional tori. This allows for fault tolerance in I/O nodes in that traffic may be re-directed to another I/O node, and flexibility in traffic routing in that I/O nodes associated with one partition may, software allowing, be used by compute nodes in a different partition.

A separate control host distributes at least a single 10 Gb/s Ethernet link (or equivalent bandwidth) to an Ethernet switch which in turn distributes 1 Gb/s Ethernet to a service card on each midplane. The control systems on BG/Q and BG/P are similar. The midplane service card in turn distributes the system clock, provides other rack control function, and consolidates individual 1 Gb Ethernet connections to the node and I/O boards. On each node board and I/O board the service bus converts from 1 Gb Ethernet to local busses (HAG, I2C, SPI) through a pair of Field Programmable Gate Array (FPGA) function blocks codenamed iCon and Palimino. The local busses of iCon & Palimino connect to the Link and Compute ASICs, local power supplies, various sensors, for initialization, debug, monitoring, and other access functions.

Bulk power conversion is N+1 redundant. The input is 440V 3phase, with one power supply with one input line cord and thus one bulk power supply per midplane at 48V output. Following the 48V DC stage is a custom N+1 redundant regulator supplying up to 7 different voltages built directly into the node and I/O boards. Power is brought from the bulk supplies to the node and I/O boards via cables. Additionally DC-DC converters of modest power are present on the midplane service card, to maintain persistent power even in the event of a node card failure, and to centralize power sourcing of low current voltages. Each BG/Q circuit card contains an EEPROM with Vital product data (VPD).

From a full system perspective, the supercomputer as a whole is controlled by a Service Node, which is the external computer that controls power-up of the machine, partitioning, boot-up, program load, monitoring, and debug. The Service Node runs the Control System software. The Service Node communicates with the supercomputer via a dedicated, 1 Gb/s Ethernet connection, which is distributed via an external Ethernet switch to the Service Cards that control each midplane (half rack). Via an Ethernet switch located on this Service Card, it is further distributed via the Midplane Card to each Node Card and Link Card. On each Service Card, Node Card and Link Card, a branch of this Ethernet terminates on a programmable control device, implemented as an FPGA (or a connected set of FPGAs). The FPGA(s) translate between the Ethernet packets and a variety of serial protocols to communicate with on-card devices: the SPI protocol for power supplies, the $I^2C$ protocol for thermal sensors and the JTAG protocol for Compute and Link chips.

On each card, the FPGA is therefore the center hub of a star configuration of these serial interfaces. For example, on a Node Card the star configuration comprises 34 JTAG ports (one for each compute or 10 node) and a multitude of power supplies and thermal sensors.

Thus, from the perspective of the Control System software and the Service Node, each sensor, power supply or ASIC in the supercomputer system is independently addressable via a standard 1 Gb Ethernet network and IP packets. This mechanism allows the Service Node to have direct access to any device in the system, and is thereby an extremely powerful tool for booting, monitoring and diagnostics. Moreover, the Control System can partition the supercomputer into independent partitions for multiple users. As these control functions flow over an independent network that is inaccessible to the users, security is maintained.

In summary, the computer utilizes a 5D torus interconnect network for various types of inter-processor communication. PCIe-2 and low cost switches and RAID systems are used to support locally attached disk storage and host (login nodes). A 1 Gb Ethernet (coupled locally on card to a variety of serial protocols) is used for control, diagnostics, debug, and some aspects of initialization. Two types of high bandwidth, low latency networks make up the system "fabric".

4. System Interconnect—Five Dimensional Torus

The Blue Gene®/Q compute ASIC incorporates an integrated 5-D torus network router. There are 11 bidirectional 2 GB/s raw data rate links in the compute ASIC, 10 for the 5-D torus and 1 for the optional I/O link. A network messaging unit (MU) implements the Blue Gene/P style network DMA functions to allow asynchronous data transfers over the 5-D torus interconnect. MU is logically separated into injection and reception units.

The injection side MU maintains injection FIFO pointers, as well as other hardware resources for putting messages into the 5-D torus network. Injection FIFOs are allocated in main memory and each FIFO contains a number of message descriptors. Each descriptor is 64 bytes in length and includes a network header for routing, the base address and length of the message data to be sent, and other fields like type of packets, etc., for the reception MU at the remote node. A processor core prepares the message descriptors in injection FIFOs and then updates the corresponding injection FIFO pointers in the MU. The injection MU reads the descriptors and message data packetizes messages into network packets and then injects them into the 5-D torus network.

Three types of network packets are supported: (1) Memory FIFO packets; the reception MU writes packets including both network headers and data payload into pre-allocated reception FIFOs in main memory. The MU maintains pointers to each reception FIFO. The received packets are further processed by the cores; (2) Put packets; the reception MU writes the data payload of the network packets into main memory directly, at addresses specified in network headers. The MU updates a message byte count after each packet is received. Processor cores are not involved in data movement, and have to check that the expected numbers of bytes are received by reading message byte counts; (3) Get packets; the data payload contains descriptors for the remote nodes. The MU on a remote node receives each get packet into one of its injection FIFOs, then processes the descriptors and sends data back to the source node.

All MU resources are in memory mapped I/O address space and provide uniform access to all processor cores. In practice, the resources are likely grouped into smaller groups to give each core dedicated access. The preferred embodiment is to support 544 injection FIFOs, or 32/core, and 288 reception FIFOs, or 16/core. The reception byte counts for put messages are implemented in L2 using the atomic counters described in section 2.4.6 below. There is effectively unlimited number of counters subject to the limit of available memory for such atomic counters.

The MU interface is designed to deliver close to the peak 18 GB/s (send)+18 GB/s (receive) 5-D torus nearest neighbor data bandwidth, when the message data is fully contained in the 32 MB L2. This is basically 1.8 GB/s+1.8 GB/s maximum data payload bandwidth over 10 torus links. When the total message data size exceeds the 32 MB L2, the maximum network bandwidth is then limited by the sustainable external DDR memory bandwidth.

The Blue Gene/P DMA drives the 3-D torus network, but not the collective network. On Blue Gene/Q, because the collective and I/O networks are embedded in the 5-D torus with a uniform network packet format, the MU will drive all regular torus, collective and I/O network traffic with a unified programming interface.

5. Global Clock

There are a wide variety of inter-chip and intra-chip clock frequencies for BG/Q. The processor frequency is 1.6 GHz and portions of the chip run at /2, /4, /8, or /16 of this clock. The high speed communication in BG/Q is accomplished by sending and receiving data between ASICs at 4 Gb/s, or 2.5 times the target processor frequency of 1.6 GHz. All signaling between BG/Q ASICs is based on IBM Micro Electronic Division (IMD) High Speed I/O which accepts an input clock at ⅛ the datarate, or 500 MHz. The optical communication is at 8 Gb/s but due to the need for DC balancing of the currents, this interface is 8 b-10 b encoded and runs at 10 Gb/s with an interface of 1 GBs/. The memory system is based on SDRAM-DDR3 at 1.333 Gb/s (667 MHz address frequency).

These frequencies are generated on the BQC chip through Phase Locked Loops. All PLLs will be driven from a single global 100 MHz clock, with similar hardware as BG/P.

The BG/P clock network uses over 10,000 1-10 PECL clock redrive buffers to distribute the signal derived from a single source to the up to 36 racks or beyond. There are 7 layers to the clock tree. The first 3 layers exist on the 1->10 clock fanout cards on each rack, connected with max 5 m differential cables. The next 4 layers exist on the service and node or I/O boards themselves. For a 96-rack BG/Q system, IBM has designed an 8-layer LVPECL clock redrive tree with slightly longer rack-to-rack cables.

Figure 14:
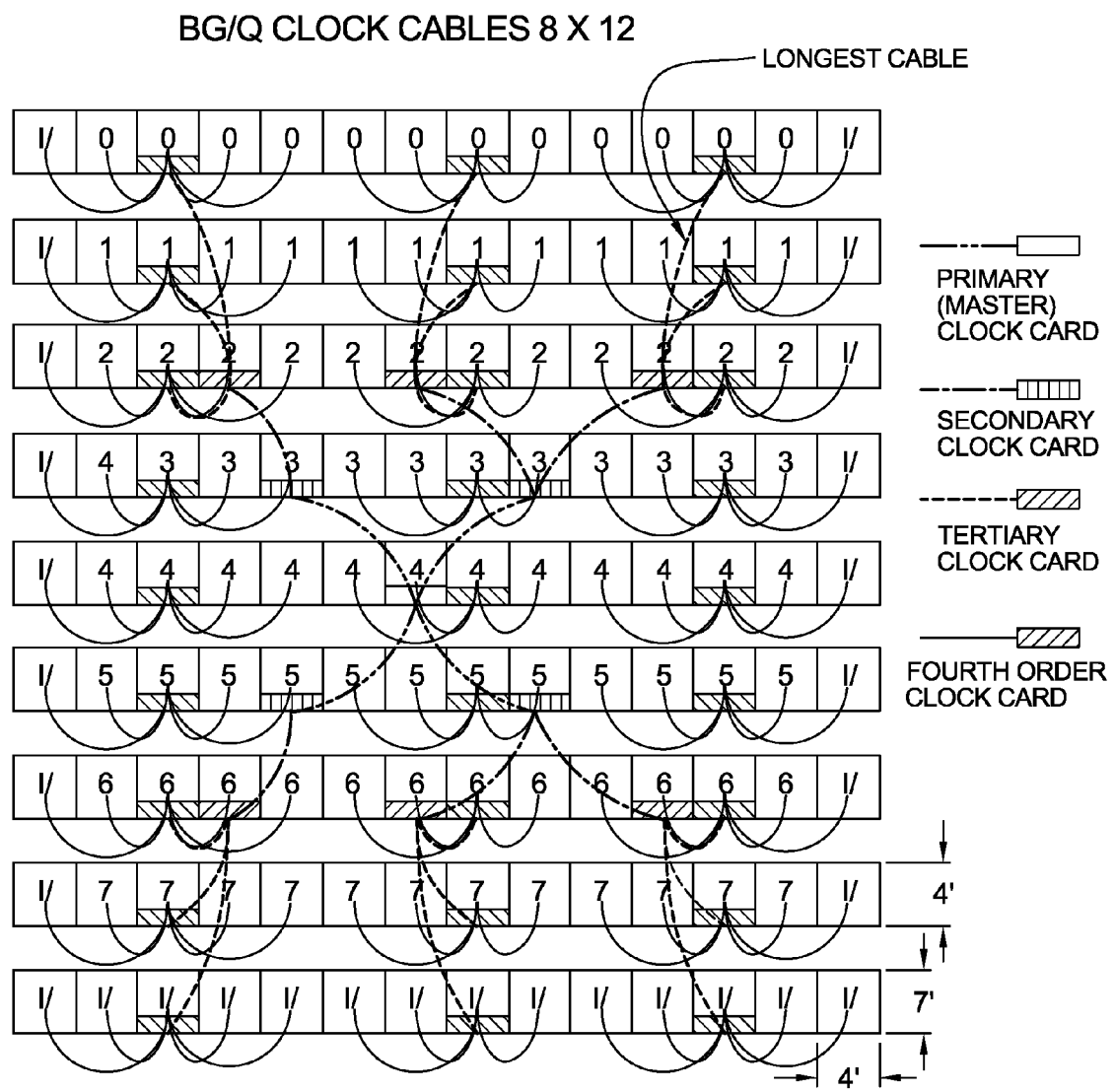
FIG. 14 illustrates an exemplary of BlueGene/Q clock fanout to 96 racks in one embodiment.

The service card contains circuitry to drop a clock pulse, with the number of clocks to be dropped and the spacing between dropped clocks variable. Glitch detection circuitry in BQC detects these clock glitches and uses them for tight synchronization. FIG. 14 shows an intra-rack clock fanout designed for the BG/Q 96 rack system with racks in a row on 5 foot pitch, and optional I/O racks at the end of each row.

6. Cooling

Blue Gene/Q racks are indirect water cooled. The reason for water cooling is (1) to maintain the junction temperatures of the optical modules to below their max operating frequency of 55 C, and (2) to reduce infrastructure costs. The preferred embodiment is to use a serpentine water pipe which lies above the node card. Separable metal heat-spreaders lie between this pipe and the major heat producing devices. Compute cards are cooled with a heat-spreader on one side, with backside DRAMs cooled by a combination of conduction and modest airflow which is provided for the low power components.

Optical modules have a failure rate which is a strong function of temperature. The operating range is 20 C to 55 C, but we can expect highest reliability and lowest error rate if we can maintain an even temperature at the low end of this range. This favors indirect water cooling.

Using indirect water cooling in this manner controls the water temperature above dew point, to avoid condensation on the exposed water pipes. This indirect water cooling can result in dramatically reduced operating costs as the power to run larger chillers can be largely avoided. They will provide a 7.5 MW power and cooling upgrade for a 96-rack system, this would be an ideal time to also save dramatically on infrastructure costs by providing water not at the usual 6 C for air conditioning, but rather at the 18 C minimum temperature for indirect water cooling.

7. Power Distribution

Each midplane is individually powered from a bulk power supply formed of N+1 redundant, hot pluggable 440V (380V-480V) 3 phase AC power modules, with a single line cord with a plug. The rack contains an on-off switch. The 48V power and return are filtered to reduce electromagnetic emissions (EMI) and are isolated from low voltage ground to reduce noise, and are then distributed through a cable harness to the midplanes.

Following the bulk power are local, redundant DC-DC converters. The DC-DC converter is formed of two components. The first component, a high current, compact front-end module, will be direct soldered in N+1, or N+2, fashion at the point of load on each node and I/O board. Here N+2 redundancy is used for the highest current applications, and allows a fail without replacement strategy. The higher voltage, more complex, less reliable back-end power regulation modules will be on hot pluggable circuit cards (DCA for direct current assembly), 1+1 redundant, on each node and I/O board.

The 48V power is always on. To service a failed DCA board, the board is commanded off (to draw no power), its "hot" 48V cable is removed, and the DCA is then removed and replaced into a still running node or I/O board. There are thermal overrides to shutdown power as a "failsafe", otherwise local DC-DC power supplies on the node, link, and service cards are powered on by the service card under host control. Generally node cards are powered on at startup and powered down for service. As a service card runs a rack, it is not necessary to hot plug a service card and so this card is replaced by manually powered off the bulk supplies using the circuit breaker built into the bulk power supply chassis.

The service port, clocks, link chips, fans, and temperature and voltage monitors are always active.

Power Management

We allow use of power management to lower power usage, we expect to have a robust power management system based on clock gating. Processor chip internal clock gating is triggered in response to at least 3 inputs: (a) total midplane power (b) local DC-DC power on any of several voltage domains (c) critical device temperatures. The BG/Q control network senses this information and conveys it to the compute and I/O processors. The bulk power supplies create (a), the FPGA power supplies controllers in the DCAs provide (b), and local temperature sensors either read by the compute nodes, or read by external A-D converters each compute and I/O card, provide (c). As in BG/P, the local FPGA is heavily invested in this process through a direct, 2 wire link between BQC and Palimino.

System Software

As software is a critical component in any computer and is especially important in computers with new architectures, there is implemented a robust layered system of software that at the lowest level is very simple and efficient, yet sufficient to run most parallel applications.

Figure 15:
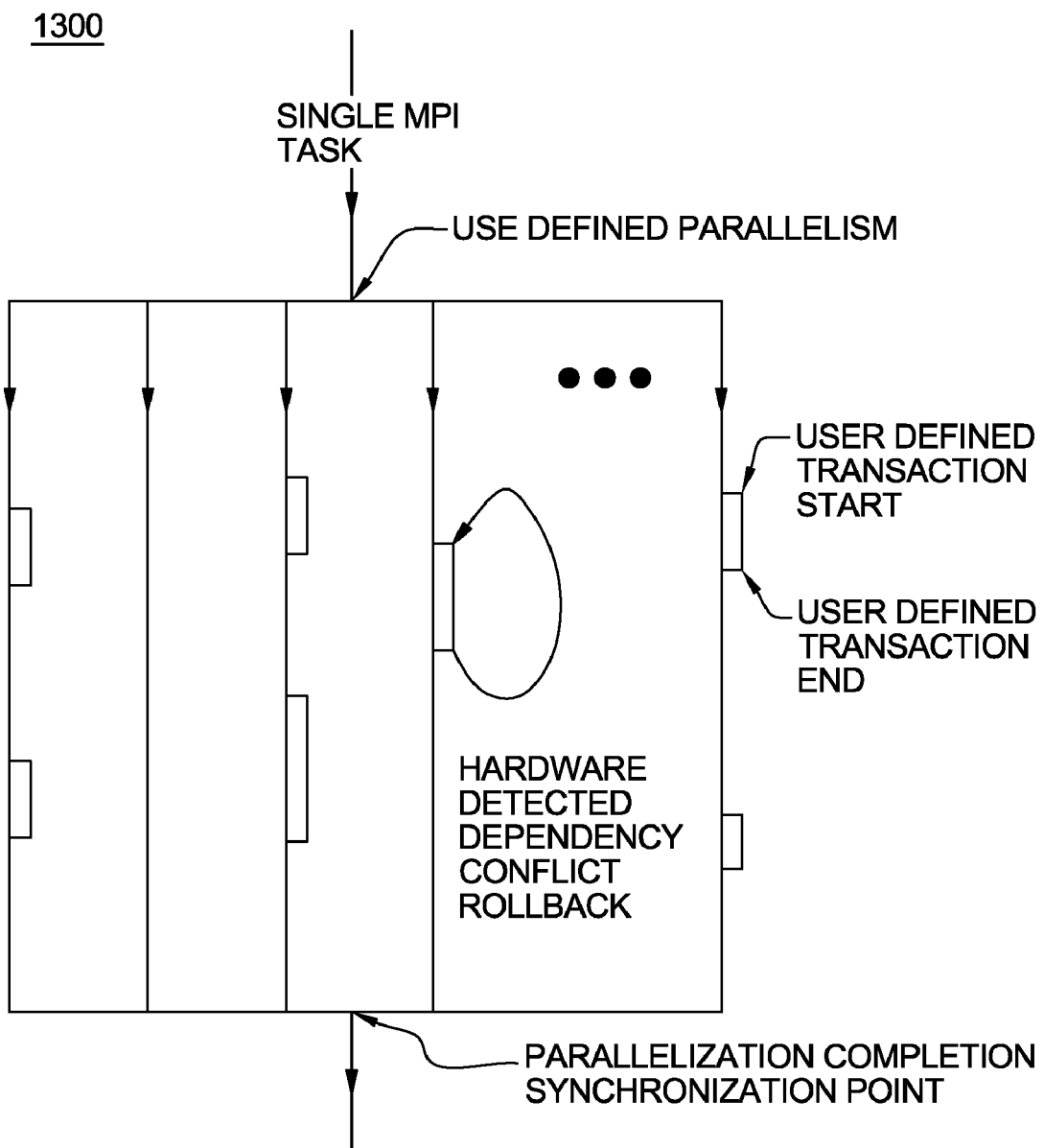
FIG. 15 illustrates a transactional memory mode in one embodiment.

The control system:
Compute nodes dedicated to running user application, simple compute node kernel (CNK)
I/O nodes run Linux and provide a more complete range of OS services—files, sockets, process launch, signaling, debugging, and termination
Service node performs system management services (e.g., heart beating, monitoring errors)—transparent to application software FIG. 15 illustrates a transactional memory mode in one embodiment. A user defines parallel work to be done. A user explicitly defines a start and end of transactions within parallel work that are to be treated as atomic. A compiler performs, without limitation, one or more of: Interpreting user program annotations to spawn multiple threads; Interpreting user program annotation for start of transaction and save state to memory on entry to transaction to enable rollback; At the end of transactional program annotation, testing for successful completion and optionally branch back to rollback pointer. A transactional memory 1300 supports detecting transaction failure and rollback. An L1 (Level 1) cache visibility for L1 cache hits as well as misses allowing for ultra low overhead to enter a transaction.

Local Rollback—The Case when there is no I/O

We first describe the invention in which there is no I/O into and out of the node, including messaging between nodes. Checkpoints to disk or stable storage are still taken periodically, but at a reduced frequency. There is a local rollback interval. If the end of the interval is reached without a soft error, the interval is successful and a new interval can be started. Under certain conditions to be described, if a soft error occurs during the local rollback interval, the application can be restarted from the beginning of the local interval and re-executed. This can be done without restoring the data from the previous complete checkpoint, which typically reads in data from disk. If the end of the interval is then reached, the interval is successful and the next interval can be started. If such conditions are met, we term the interval "rollbackable". If the conditions are not met, a restart from the previous complete checkpoint is performed. The efficiency of the method thus depends upon the overhead to set up the local rollback intervals, the soft error rate, and the fraction of intervals that are rollbackable.

In this approach, certain types of soft errors cannot be recovered via local rollback under any conditions. Examples of such errors are an uncorrectable ECC error in the main memory, as this error corrupts state that is not backed up by multiversioning, or an unrecoverable soft error in the network logic, as this corrupts state that can not be reinstated by rerunning. If such a soft error occurs, the interval is not rollbackable. We categorize soft errors into two classes: potentially rollbackable, and unconditionally not rollbackable. In the description that follows, we assume the soft error is potentially rollbackable. Examples of such errors include a detected parity error on a register inside the processor core.

At the start of each interval, each thread on each core saves it's register state (including the program counter). Certain memory mapped registers outside the core, that do not support speculation and need to be restored on checkpoint restore, are also saved. A new speculation generation id tag T is allocated and associated with all memory requests run by the cores from hereon. This ID is recognized by the L2-cache to treat all data written with this ID to take precedence, i.e., to maintain semantics of these accesses overwriting all previously written data. At the start of the interval, the L2 does not contain any data with tag T and all the data in the L2 has tags less than T, or has no tag associated ($T_0$) and is considered nonspeculative. Reads and writes to the L2 by threads contain a tag, which will be T for this next interval.

When a thread reads a line that is not in the L2, that line is brought into the L2 and given the non-speculative tag $T_0$. Data from this version is returned to the thread. If the line is in the L2, the data returned to the thread is the version with the newest tag.

When a line is written to the L2, if a version of that line with tag T does not exist in the L2, a version with tag T is established. If some version of the line exists in the L2, this is done by copying the newest version of that line into a version with tag T. If a version does not exist in the L2, it is brought in from memory and given tag T. The write from the thread includes byte enables that indicate which bytes in the current write command are to be written. Those bytes with the byte enable high are then written to the version with tag T. If a version of the line with tag T already exists in the L2, that line is changed according to the byte enables.

At the end of an interval, if no soft error occurred, the data associated with the current tag T is committed by changing the state of the tag from speculative to committed. The L2 runs a continuous background scrub process that converts all occurrences of lines written with a tag that has committed status. It merges all committed version of the same address into a single version based on tag ordering and removes the versions it merged.

The L2 is managed as a set-associative cache with a certain number of lines per set. All versions of a line belong to the same set. When a new line, or new version of a line, is established in the L2, some line in that set may have to be written back to memory. In speculative mode, non-committed, or speculative, versions are never allowed to be written to the memory, In rollback mode, non-committed versions can be written to the memory, but an "overflow" bit in a control register in the L2 is set to 1 indicating that such a write has been done. At the start of an interval all the overflow bits are set to 0.

Now consider the running during a local rollback interval. If a detected soft error occurs, this will trigger an interrupt that is delivered to at least one thread on the node. Upon receiving such an interrupt, the thread issues a core-to-core interrupt to all the other threads in the system which instructs them to stop running the current interval. If at this time, all the L2 overflow bits are 0, then the main memory contents have not been corrupted by data generated during this interval and the interval is rollbackable. If one of the overflow bits is 1, then main memory has been corrupted by data in this interval, the interval is not rollbackable and running is restarted from the most previous complete checkpoint.

If the interval is rollbackable, the cores are properly re-initialized, all the lines in the L2 associated with tag T are invalidated, all of the memory mapped registers and thread registers are restored to their values at the start of the interval, and the running of the interval restarts. The L2 invalidates the lines associated with tag T by changing the state of the tag to invalid. The L2 background invalidation process removes occurrences of lines with invalid tags from the cache.

This can be done in such a way that is completely transparent to the application being run. In particular, at the beginning of the interval, the kernel running on the threads can, in coordinated fashion, set a timer interrupt to fire indicating the end of the next interval. Since interrupt handlers are run in kernel, not user mode, this is invisible to the application. When this interrupt fires, and no detectable soft-error has occurred during the interval, preparations for the next interval are made, and the interval timer is reset. Note that this can be done even if an interval contained an overlow event (since there was no soft error). The length of the interval should be set so that an L2 overflow is unlikely to occur during the interval. This depends on the size of the L2 and the characteristics of the application workload being run.

Local Rollback—The Case with I/O

We now describe the invention in the more complicated case of when there is I/O, specifically messaging traffic between nodes. If all nodes participate in a barrier synchronization at the start of an interval, and if there is no messaging activity at all during the interval (either data injected into the network or received from the network) on every node, then if a rollbackable software error occurs during the interval on one or more nodes, then those nodes can re-run the interval and if successful, enter the barrier for the next interval. In such a case, the other nodes in the system are unaware that a rollback is being done somewhere else. If one such node has a soft error that is non-rollbackable, then all nodes may begin running from the previous full checkpoint. There are three problems with this approach:

1. The time to do the barrier may add significantly to the cost of initializing the interval.
2. Such intervals without any messaging activity may be rare, thereby reducing the fraction of rollbackable intervals.
3. Doing the barrier, in and of itself, may involve injecting messages into the network.

We therefore seek alternative conditions that do not require barriers and relax the assumption that no messaging activity occurs during the interval. This will reduce the overhead and increase the fraction of rollbackable intervals. In particular, an interval will be rollbackable if no data that was generated during the current interval is injected into the network (in addition to some other conditions to be described later). Thus an interval is rollbackable if the data injected into the network in the current interval were generated during previous intervals. Thus packets arriving during an interval can be considered valid. Furthermore, if a node does do a local rollback, it will never inject the same messages (packets) twice, (once during the failed interval and again during the re-running). In addition note that the local rollback intervals can proceed independently on each node, without coordination from other nodes, unless there is a non rollbackable interval, in which case the entire application may be restarted from the previous checkpoint.

We assume that network traffic is handled by a hardware Message Unit (MU), specifically the MU is responsible for putting messages, that are packetized, into the network and for receiving packets from the network and placing them in memory. We assume that the MU is similar to the DMA engine on BG/P described in much more detail in "Overview of the IBM Blue Gene/P project", IBM® Blue Gene® team, IBM J. RES. & DEV., Vol. 52, No. 1/2 January/March 2008, wholly incorporated by reference as if set forth herein. Dong Chen, et al., "DISTRIBUTED PARALLEL MESSAGING UNIT FOR MULTIPROCESSOR SYSTEMS", Ser. No. 12/693,972, wholly incorporated by reference as if set forth herein, also describes the MU in detail. Dong Chen, et al., "SUPPORT FOR NON-LOCKING PARALLEL RECEPTION OF PACKETS BELONGING TO THE SAME FIFO", Ser. No. 12/688,747, wholly incorporated by reference as if set forth herein, also describes the MU in detail. Specifically, there are message descriptors that are placed in Injection FIFOs. An Injection Fife is a circular buffer in main memory. The MU maintains memory mapped registers that, among other things contain pointers to the start, head, tail and end of the FIFO. Cores inject messages by placing the descriptor in the memory location pointed to by the tail, and then updating the tail to the next slot in the FIFO. The MU recognizes non-empty Fifos, pulls the descriptor at the head of the FIFO, and injects packets into the network as indicated in the descriptor, which includes the length of the message, its starting address, its destination and other information having to do with what should be done with the message's packets upon reception at the destination. When all the packets from a message have been injected, the MU advances the head of the FIFO. Upon reception, if the message is a "direct put", the payload bytes of the packet are placed into memory starting at an address indicated in the packet. If the packets belong to a "memory FIFO" message, the packet is placed at the tail of a reception FIFO and then the MU updates the tail. Reception FIFOS are also circular buffers in memory and the MU again has memory mapped registers pointing to the start, head, tail and end of the FIFO. Threads read packets at the head of the FIFO (if non-empty) and then advance the head appropriately. The MU may also support "remote get" messages. The payload of such messages are message descriptors that are put into an injection FIFO. In such a way, one node can instruct another node to send data back to it, or to another node.

When the MU issues a read to an L2, it tags the read with a non-speculative tag. In rollback mode, the L2 still returns the most recent version of the data read. However, if that version was generated in the current interval, as determined by the tag, then a "rollback read conflict" bit is set in the L2. (These bits are initialized to 0 at the start of an interval.) If subsections (sublines) of an L2 line can be read, and if the L2 tracks writes on a subline basis, then the rollback read conflict bit is set when the MU reads the subline that a thread wrote in the current interval. For example, if the line is 128 bytes, there may be 8 subsections (sublines) each of length 16 bytes. When a line is written speculatively, it notes in the L2 directory for that line which sublines are changed. If a soft error occurs during the interval, if any rollback read conflict bit is set, then the interval cannot be rolled back.

When the MU issues a write to the L2, it tags the write with a non-speculative id. In rollback mode, both a non-speculative version of the line is written and if there are any speculative versions of the line, all such speculative versions are updated. During this update, the L2 has the ability to track which subsections of the line were speculatively modified. When a line is written speculatively, it notes which sublines are changed. If the non-speculative write modifies a subline that has been speculatively written, a "write conflict" bit in the L2 is set, and that interval is not rollbackable. This permits threads to see the latest MU effects on the memory system, so that if no soft error occurs in the interval, the speculative data can be promoted to non-speculative for the next interval. In addition, if a soft error occurs, it permits rollback to non-speculative state.

On BG/Q, the MU may issue atomic read-modify-write commands. For example, message byte counters, that are initialized by software, are kept in memory. After the payload of a direct put packet is written to memory, the MU issues an atomic read-modify-write command to the byte counter address to decrement the byte counter by the number of payload bytes in the packet. The L2 treats this as both a read and a write command, checking for both read and write conflicts, and updating versions.

In order for the interval to be rollbackable, certain other conditions may be satisfied. The MU cannot have started processing any descriptors that were injected into an injection FIFO during the interval. Violations of this "new descriptor injected" condition are easy to check in software by comparing the current MU injection FIFO head pointers with those at the beginning of the interval, and by tracking how many descriptors are injected during the interval. (On BG/Q, for each injection FIFO the MU maintains a count of the number of descriptors injected, which can assist in this calculation.)

In addition, during the interval, a thread may have received packets from a memory reception FIFO and advanced the FIFO's head pointer. Those packets will not be resent by another node, so in order for the rollback to be successful, it may be able to reset the FIFO's head pointer to what it was at the beginning of the interval so that packets in the FIFO can be "re-played". Since the FIFO is a circular buffer, and since the head may have been advanced during the interval, it is possible that a newly arrived packet has overwritten a packet in the FIFO that may be re-played during the local rollback. In such a case, the interval is not rollbackable. It is easy to design messaging software that identifies when such an over-write occurs. For example, if the head is changed by an "advance_head" macro/inline or function, advance_head can increment a counter representing the number of bytes in the FIFO between the old head and the new head. If that counter exceeds a "safe" value that was determined at the start of the interval, then a write to an appropriate memory location system that notes the FIFO overwrite condition occurred. Such a write may be invoked via a system call. The safe value could be calculated by reading the FIFOs head and tail pointers at the beginning of the interval and, knowing the size of the FIFO, determining how many bytes of packets can be processed before reaching the head.

On BG/Q barriers or global interrupts may be initiated by injecting descriptors into FIFOs, but via writing a memory mapped register that triggers barrier/interrupt logic inside the network. If during an interval, a thread initiates a barrier and a soft error occurs on that node, then the interval is not rollbackable. Software can easily track such new barrier/interrupt initiated occurrences, in a manner similar to the FIFO overwrite condition. Or, the hardware (with software cooperation) can set a special bit in the memory mapped barrier register whenever a write occurs; if that bit is initialized to 0 at the beginning of the interval, then if the bit is high, the interval cannot be rolled back.

We assume that the application uses a messaging software library that is consistent with local rollbacks. Specifically, hooks in the messaging software support monitoring the reception FIFO overwrite condition, the injection FIFO new descriptor injected condition, and the new global interrupt/barrier initiated condition. In addition, if certain memory mapped I/O registers are written during an interval, such as when a FIFO is reconfigured by moving it, or resizing it, an interval cannot be rolled back. Software can be instrumented to track writes to such memory mapped I/O registers and to record appropriate change bits if the conditions to rollback an interval are violated. These have to be cleared at the start of an interval, and checked when soft errors occur.

Putting this together, at the beginning of an interval:
1. Threads set the L2 rollback read and write conflict and overflow bits to 0.
2. Threads save the injection MU FIFO tail pointers and reception FIFO head pointers, compute and save the safe value and set the reception FIFO overwrite bit to 0, set the new barrier/interrupt bit to 0, and set change bits to 0.
3. Threads save their internal register states
4. A new speculative id tag is generated and used for the duration of the interval.
5. Threads begin running their normal code.

If there is no detected soft error at the end of the interval, running of the next interval is initiated. If an unconditionally not rollbackable soft error occurs during the interval, running is re-started from the previous complete checkpoint. If a potentially rollbackable soft error occurs:
1. If the MU is not already stopped, the MU is stopped, thereby preventing new packets from entering the network or being received from the network. (Typically, when the MU is stopped, it continues processing any packets currently in progress and then stops.)
2. The rollbackable conditions are checked: the rollback read and write conflict bits, the injection FIFO new descriptor injected condition, the reception FIFO overwrite bits, the new barrier/interrupt initiated condition, and the change bits. If the interval is not rollbackable, running is re-started from the previous complete checkpoint. If the interval is rollbackable, proceed to step 3.
3. The cores are reinitialized, all the speculative versions associated with the ID of the last interval in the L2 are invalidated (without writing back the speculative L2 data to the memory), all of the memory mapped registers and thread registers are restored to their values at the start of the interval. The injection FIFO tail pointers are restored to their original values, the reception FIFO head pointers are restored to their original values. If the MU was not already stopped, restart the MU.
4. Running of the interval restarts.

Interrupts

The above discussion assumes that no real-time interrupts such as messages from the control system, or MU interrupts occur. ON BG/Q, a MU interrupt may occur if a packet with an interrupt bit set is placed in a memory FIFO, the amount of free space in a reception FIFO decreases below a threshold, or the amount of free space in an injection FIFO crosses a threshold. For normal injection FIFOS, the interrupt occurs if the amount of free space in the FIFO increases above a threshold, but for remote get injection FIFOs the interrupt occurs if the amount of free space in the FIFO decreases below a threshold.

A conservative approach would be to classify an interval as non rollbackable if any of these interrupts occurs, but we seek to increase the fraction of rollbackable intervals by appropriately handling these interrupts. First, external control system interrupts or remote get threshold interrupts are rare and may trigger very complicated software that is not easily rolled back. So if such an interrupt occurs, the interval will be marked not rollbackable.

For the other interrupts, we assume that the interrupt causes the messaging software to run some routine, e.g., called "advance", that handles the condition.

For the reception FIFO interrupts, advance may pull packets from the FIFO and for an injection FIFO interrupt, advance may inject new descriptors into a previously full injection FIFO. Note that advance can also be called when such interrupts do not occur, e.g., it may be called when an MPI application calls MPI_Wait. Since the messaging software may correctly deal with asynchronous arrival of messages, it may be capable of processing messages whenever they arrive. In particular, suppose such an interrupt occurs during an interval, and software notes that it has occurred, and an otherwise rollbackable soft error occurs during the interval. Note that when the interval is restarted, there are at least as many packets in the reception FIFO as when the interrupt originally fired. If when the interval is restarted, the software sets the hardware interrupt registers to re-trigger the interrupt, this will cause advance to be called on one or more threads at, or near the beginning of the interval (if the interrupt is masked at the time). In either case, the packets in the reception FIFO will be processed and the condition causing the interrupt will eventually be cleared. If when the interval starts, advance is already in progress, having the interrupt bit high may simply cause advance to be run a second time.

Mode Changes

As alluded to above, the L2 can be configured to run in different modes, including speculative, transactional, rollback and normal. If there is a mode change during an interval, the interval is not rollbackable.

Multiple Tag Domains

In the above description, it assumes that there is a single "domain" of tags. Local rollback can be extended to the case when the L2 supports multiple domain tags. For example, suppose there are 128 tags that can be divided into up to 8 tag domains with 16 tags/domain. Reads and writes in different tag domains do not affect one another. For example, suppose there are 16 (application) cores per node with 4 different processes each running on a set of 4 cores. Each set of cores could comprise a different tag domain. If there is a shared memory region between the 4 processors, that could comprise a fifth tag domain. Reads and writes by the MU are non-speculative and may be seen by every domain. The checks for local rollback may be satisfied by each tag domain. In particular, if the overflow, read and write conflict bits are on a per domain basis, then an interval cannot be rolled back if any of the domains indicate a violation.

Figure 1:
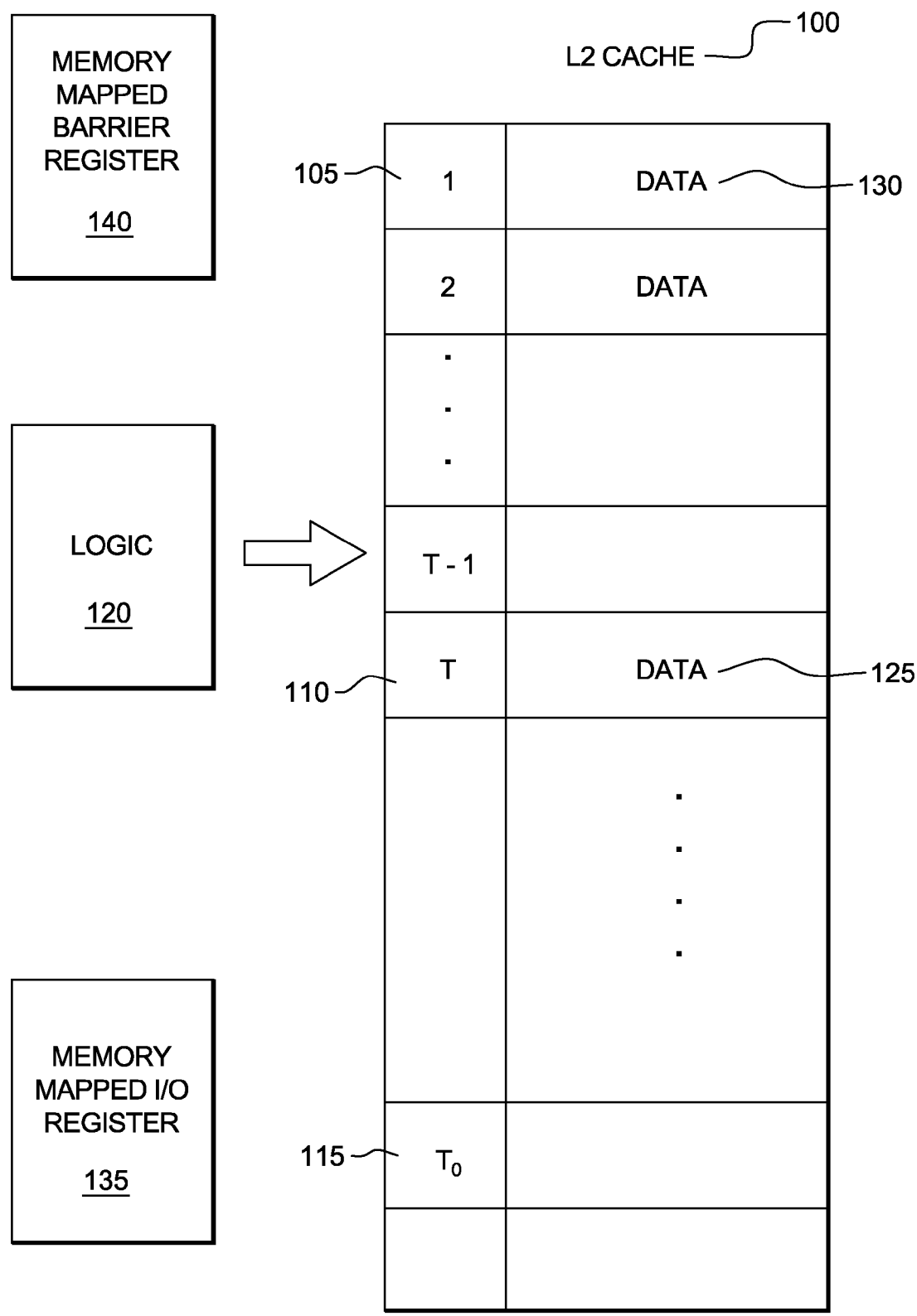
FIG. 1 illustrates a system diagram of a cache memory device, e.g., an L2 (Level 2) cache memory device according to one embodiment of the present invention.

FIG. 1 illustrates a cache memory, e.g., L2 cache memory device ("L2 cache") 100, and a control logic device 120 for controlling the L2 cache 100 according to one embodiment. Under software control, a local rollback is performed, e.g., by the control logic device 120. Local rollback refers to resetting processors, reinstating states of the processors as of the start of a last computation interval, and using the control logic device 120 to invalidate all or some memory state changes performed since the start of the last interval in the L2, and restarting the last computational interval. A computational interval (e.g., an interval 1 (200) in FIG. 2) includes certain number of instructions. The length of the computational interval is set so that an L2 cache overflow is unlikely to occur during the interval. The length of the interval depends on a size of the L2 cache and characteristics of an application workload being run.

The L2 cache 100 is multi-versioned to support both speculative running mode, a transactional memory mode, and a rollback mode. A speculative running mode computes instruction calculations ahead of their time as defined in a sequential program order. In such a speculative mode, data in the L2 cache 100 may be speculative (i.e., assumed ahead or computed ahead and may subsequently be validated (approved), updated or invalidated). A transactional memory mode controls a concurrency or sharing of the L2 cache 100, e.g., by enabling read and write operations to occur at simultaneously, and by allowing that intermediate state of the read and write operations are not visible to other threads or processes. A rollback mode refers to performing a local rollback.

In one embodiment, the L2 cache 100 is partitioned into multiple slices, each of which acts independently. In the speculative or transactional mode, data in a main memory (not shown) is always valid. Speculative data held in the L2 cache 100 are not written back to the main memory. In the rollback mode, speculative data may be written back to the main memory, at which point the speculative data cannot be distinguished from committed data and the interval can not be rolled back if an error occurs. In addition to supporting a common caching functionality, the L2 cache 100 is operatively controlled or programmed for running in the rollback mode. In one embodiment, operating features include, but are not limited to: an ability to store a same cache line (e.g., 128 bytes) of data multiple times in the cache (i.e., multi-versioned); Each such cache line having or provided with a generation ID tag (e.g., tag 1 (105) and a tag T (110) in FIG. 1 for identifying a version of data); Provide an ordering mechanism such that tags can be ordered from an oldest data to a newest data; Provide a mechanism for requesting and managing new tags and for "scrubbing" (i.e., filtering) the L2 cache 100 to clean old tags. For example, the L2 cache 100 includes multiple version of data (e.g., a first version (oldest version) 130 of data tagged with "1" (105), a newest version 125 of data tagged with "T" (110)) indicating an order, e.g., an ascending order, of the tags attached to the data. How to request and manage new tags are described below in detail.

Figure 2:
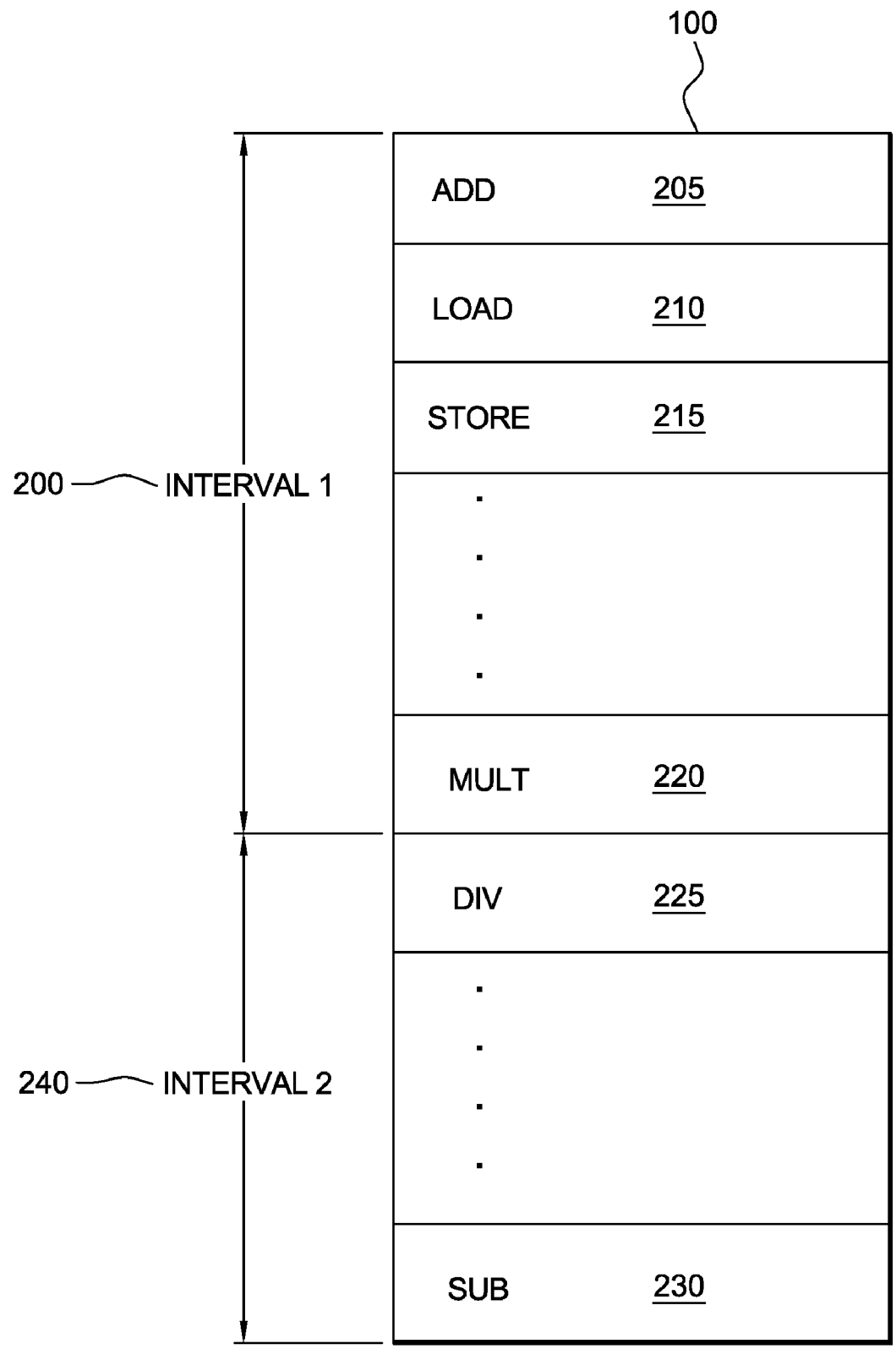
FIG. 2 illustrates local rollback intervals within the L2 cache memory device according to one embodiment.

FIG. 2 illustrates exemplary local rollback intervals 200 and 240 defined as instruction sequences according to one exemplary embodiment. In this exemplary embodiment, the sequences include various instructions including, but not limited to: an ADD instruction 205, a LOAD instruction 210, a STORE instruction 215, a MULT instruction 220, a DIV instruction 225 and a SUB instruction 230. A local rollback interval refers to a set of instructions that may be restarted upon detecting a soft error and for which the initial state at the sequence start can be recovered. Software (e.g., Operating System, etc.) or hardware (e.g., the control logic device 120, a processor, etc.) determines a local rollback interval 1 (200) to include instructions from the ADD instruction 205 to the MULT instruction 220. How to determine a local rollback interval is described below in detail. If no soft error occurs during the interval 1 (200), the software or hardware decides that the interval 1 (200) is successful and starts a new interval (e.g., an interval 2 (240)). If a rollbackable soft error (i.e., soft error that allows instructions in the interval 1 (200) to restart and/or rerun) occur, the software or hardware restarts and reruns instructions in the interval 1 (200) from the beginning of the interval 1 (200), e.g., the ADD instruction 205, by using the control logic device 120. If a non-rollbackable soft error (i.e., soft error that does not allow instructions in the interval 1 (200) to restart and/or rerun), a processor core (e.g., CPU 911 in FIG. 9) or the control logic device 120 restarts and/or rerun instructions from a prior checkpoint.

In one embodiment, the software or hardware sets a length of the current interval so that an overflow of the L2 cache 100 is unlikely to occur during the current interval. The length of the current interval depends on a size of the L2 cache 100 and/or characteristics of an application workload being run.

In one embodiment, the control logic device 120 communicates with the cache memory, e.g., the L2 cache. In a further embodiment, the control logic device 120 is a memory management unit of the cache memory. In a further embodiment, the control logic device 120 is implemented in a processor core. In an alternative embodiment, the control logic device 120 is implemented is a separate hardware or software unit.

The following describes situations in which there is no I/O operation into and out of a node, including no exchange of messages between nodes. Checkpoints to disk or a stable storage device are still taken periodically, but at a reduced frequency. If the end of a current local rollback interval (e.g., an interval 1 (200) in FIG. 2) is reached without a soft error, the current local rollback interval is successful and a new interval can be started. If a rollbackable soft error occurs during the current local rollback interval, an application or operation can be restarted from the beginning of that local interval and rerun. This restarting and rerunning can be performed without retrieving and/or restoring data from a previous checkpoint, which typically reads in data from a disk drive. If a non-rollbackable soft error (i.e., soft error not recoverable by local rollback) occurs during the local rollback interval, a restart from the previous checkpoint occurs, e.g., by bringing in data from a disk drive. An efficiency of the method steps described in FIG. 3 thus depends upon an overhead to set up the local rollback interval, a soft error rate, and a fraction of intervals that are rollbackable.

In one embodiment, certain types of soft errors cannot be recovered via local rollback under any conditions (i.e., are not rollbackable). Examples of such errors include one or more of: an uncorrectable ECC error in a main memory, as this uncorrectable ECC error may corrupt a state that is not backed up by the multi-versioning scheme; an unrecoverable soft error in a network, as this unrecoverable error may corrupt a state that can not be reinstated by rerunning. If such a non-rollbackable soft error occurs, the interval is not rollbackable. Therefore, according to one embodiment of the present invention, there are two classes of soft errors: potentially rollbackable and unconditionally not rollbackable. For purposes of description that follow, it is assumed that a soft error is potentially rollbackable.

At the start of each local rollback interval, each thread on each processor core stores its register state (including its program counter), e.g., in a buffer. Certain memory mapped registers (i.e., registers that have their specific addresses stored in known memory locations) outside the core that do not support the speculation (i.e., computing ahead or assuming future values) and need to be restored on a checkpoint are also saved, e.g., in a buffer. A new (speculation) generation ID tag "T" (e.g., a tag "T" bit or flag 110 in FIG. 1) is allocated and associated with some or all of memory requests run by the core. This ID tag is recognized by the L2 cache to treat all or some of the data written with this ID tag to take precedence, e.g., to maintain semantics for overwriting all or some of previously written data. At the start of the interval, the L2 cache 100 does not include any data with the tag "T" (110) and all the data in the L2 cache have tags less than "T" (e.g., tag T−1, et seq.) (110), as shown in FIG. 1, or has no tag "$T_0$" (115) which a newest non-speculative tag (i.e., tag attached data created or requested in a normal cache mode (e.g., read and/or write)). Reads and writes to the L2 cache 100 by a thread include a tag which will be "T" for a following interval. When a thread reads a cache line that is not in the L2 cache 100, that line is brought into the L2 cache and given the non-speculative tag "$T_0$" (115). This version of data (i.e., data tagged with "$T_0$" (115)) is returned to the thread. If the line is in the L2 cache 100, the data returned to the thread is a version with the newest tag, e.g., the tag "T" (110). In one embodiment, the control logic device 120 includes a counter that automatically increment a tag bit or flag, e.g., 0, 1, . . . , T−1, T, T+1.

When a cache line is written to the L2 cache, if a version of that line with the tag "T" (110) does not exist in the L2 cache, a version with the tag "T" (110) is created. If some version of the line exists in the L2 cache, the control logic device 120 copies the newest version of that line into a version with the tag "T" (110). If a version of the line does not exist in the L2 cache, the line is brought in from a main memory and given the tag "T" (110). A write from a thread includes, without limitation, byte enables that indicate which bytes in a current write command are to be written. Those bytes with the byte enable set to a predetermined logic level (e.g., high or logic '1') are then written to a version with the tag "T" (110). If a version of the line with the tag "T" (110) already exists in the L2 cache 100, that line is changed according to the byte enables.

At the end of a local rollback interval, if no soft error occurred, data associated with a current tag "T" (110) is committed by changing a state of the tag from speculative to committed (i.e., finalized, approved and/or determined by a processor core). The L2 cache 100 runs a continuous background scrub process that converts all occurrences of cache lines written with a tag that has committed status to non-speculative. The scrub process merges all or some of a committed version of a same cache memory address into a single version based on tag ordering and removes the versions it merged.

In one embodiment, the L2 cache 100 is a set-associative cache with a certain number of cache lines per set. All versions of a cache line belong to a same set. When a new cache line, or new version of a cache line, is created in the L2 cache, some line(s) in that set may have to be written back to a main memory. In the speculative mode, non-committed, or speculative, versions are may not be allowed to be written to the main memory. In the rollback mode, non-committed versions can be written to the main memory, but an "overflow" bit in a control register in the L2 cache is set to 1 indicating that such a write has been done. At the start of a local rollback interval, all the overflow bits are set to 0.

In another embodiment, the overflow condition may cause a state change of a speculation generation ID (i.e., an ID of a cache line used in the speculative mode in which speculation the line was changed) in to a committed state in addition to or as an alternative to setting an overflow flag.

If a soft error occurs during a local rollback interval, this soft error triggers an interrupt that is delivered to at least one thread running on a node associated with the L2 cache 100. Upon receiving such an interrupt, the thread issues a core-to-core interrupt (i.e., an interrupt that allow threads on arbitrary processor cores of an arbitrary computing node to be notified within a deterministic low latency (e.g., 10 clock cycles)) to all the other threads which instructs them to stop running the current interval. If at this time, all the overflow bits of the L2 cache are 0, then contents in the main memory have not been corrupted by data generated during this interval and the interval is rollbackable. If one of the overflow bits is 1, then the main memory has been corrupted by data in this interval, the interval is not rollbackable and rerunning is restarted from the most previous checkpoint.

If the interval is rollbackable, processor cores are re-initialized, all or some of the cache lines in the L2 associated with the tag "T" (110) are invalidated, all or some of the memory mapped registers and thread registers are restored to their values at the start of the interval, and a running of the interval restarts. The control logic device 120 invalidates cache lines associated with the tag "T" (110) by changing a state of the tag "T" (110) to invalid. The L2 cache background invalidation process initiates removal of occurrences of lines with invalid tags from the L2 cache 100 in the rollbackable interval.

Recovering rollbackable soft errors can be performed in a way that is transparent to an application being run. At the beginning of a current interval, a kernel running on a thread can, in a coordinated fashion (i.e., synchronized with the control logic device 120), set a timer interrupt (i.e., an interrupt associated with a particular timing) to occur at the end of the current interval. Since interrupt handlers are run in kernel, this timer interrupt is invisible to the application. When this interrupt occurs and no detectable soft error has occurred during the interval, preparations for the next interval are made, and the timer interrupt is reset. These preparations can be done even if a local rollback interval included an overflow event (since there was no soft error).

The following describes situation in which there is at least one I/O operation, for example, messaging traffic between nodes. If all nodes participate in a barrier synchronization at the start of a current interval, if there is no messaging activity at all during the interval (no data injected into a network or received from the network) on every node, if a rollbackable software error occurs during the interval on one or more nodes, then those nodes can rerun the interval and, if successful, enter the barrier (synchronization) for a next interval.

In one embodiment, nodes are unaware that a local rollback is being performed on another node somewhere else. If a node has a soft error that is non-rollbackable, then all other nodes may begin an operation from the previous checkpoint.

In another embodiment, software or the control logic device 120 checks the at least one condition or state, which does not require barriers and that relaxes an assumption that no messaging activity occurs during a current interval. This checking of the at least one condition reduces an overhead and increases a fraction of rollbackable intervals. For example, a current interval will be rollbackable if no data that was generated during the current interval is injected into the network. Thus the current interval is rollbackable if the data injected into the network in the current interval were generated during previous intervals. Thus, packets arriving during a local rollback interval can be considered valid. Furthermore, if a node performs a local rollback within the L2 cache 100, it will not inject the same messages (packets) twice, (i.e., once during a failed interval and again during a rerunning). Local rollback intervals can proceed independently on each node, without coordination from other nodes, unless there is a non-rollbackable interval, in which case an entire application may be restarted from a previous checkpoint.

In one embodiment, network traffic is handled by a hardware Message Unit (MU). The MU is responsible for putting messages, which are packetized, into the network and for receiving packets from the network and placing them in a main memory device. In one embodiment, the MU is similar to a DMA engine on IBM® Blue Gene®/P supercomputer described in detail in "Overview of the IBM Blue Gene/P project", IBM® Blue Gene® team, IBM J. RES. & DEV., Vol. 52, No. 1/2 January/March 2008, wholly incorporated by reference as if set forth herein. There may be message descriptors that are placed in an injection FIFO (i.e., a buffer or queue storing messages to be sent by the MU). In one embodiment, an injection FIFO is implemented as a circular buffer in a main memory.

The MU maintains memory mapped registers that include, without limitation, pointers to a start, head, tail and end of the injection FIFO. Processor cores inject messages by placing the descriptor in a main memory location pointed to by the tail, and then updating the tail to a next slot in the injection FIFO. The MU recognizes non-empty slots in the injection FIFO, pulls the descriptor at the head of the injection FIFO, and injects a packet or message into the network as indicated in the descriptor, which includes a length of the message, its starting address, its destination and other information indicating what further processing is to be performed with the message's packets upon a reception at a destination node. When all or some of the packets from a message have been injected, the MU advances the head pointer of the injection FIFO. Upon a reception, if the message is a "direct put", payload bytes of the packet are placed into a receiving node's main memory starting at an address indicated in the packet. (A "direct put" is a packet type that goes through the network and writes payload data into a receiving node's main memory.) If a packet belongs to a "memory FIFO" message (i.e., a message associated with a queue or circular buffer in a main memory of a receiving node), the packet is placed at the tail of a reception FIFO and then the MU updates the tail. In one embodiment, a reception FIFO is also implemented as a circular buffer in a main memory and the MU again has memory mapped registers pointing to the start, head, tail and end of the reception FIFO. Threads read packets at the head of the reception FIFO (if non-empty) and then advance the head pointer of the reception FIFO appropriately. The MU may also support "remote get" messages. (A "remote get" is a packet type that goes through the network and is deposited into the injection FIFO on a node A. Then, the MU causes the "remote get" message to be sent from the node A to some other node.) A payload of such "remote get" message is message descriptors that are put into the injection FIFO. Through the "remote get" message, one node can instruct another node to send data back to it, or to another node.

When the MU issues a read to the L2 cache 100, it tags the read with a non-speculative tag (e.g., a tag "$T_0$" (115) in FIG. 1). In the rollback mode, the L2 cache 100 still returns the most recent version of data read. However, if that version was created in the current interval, as determined by a tag (e.g., the tag "T" (110) in FIG. 1), then a "rollback read conflict" bit is set to high in the L2 cache 100. (This "rollback read conflict" bit is initialized to 0 at the start of a local rollback interval.) The "rollback read conflict" bit indicates that data generated in the current interval is being read and/or indicates that the current interval is not rollbackable. If subsections (sublines) of an L2 cache line can be read, and if the L2 cache 100 tracks writes on a subline basis, then the rollback read conflict bit is set when the MU reads the subline that a thread wrote to in the current interval. For example, if a cache line is 128 bytes, there may be 8 subsections (sublines) each of length 16 bytes. When a cache line is written speculatively, the control logic device 120 marks that line having changed sublines, e.g., by using a flag or dirty bit. If a soft error occurs during the interval and/or if any rollback read conflict bit is set, then the interval cannot be rolled back (i.e., cannot be restarted).

In another embodiment, the conflict condition may cause a state change of the speculation ID to the committed state in addition to or as an alternative to setting a read conflict bit.

When the MU issues a write to the L2 cache 100, it tags the write with a non-speculative ID (e.g., a tag "$T_0$" (115) in FIG. 1). In the rollback mode, a non-speculative version of a cache line is written to the L2 cache 100 and if there are any speculative versions of the cache line, all such speculative versions are updated. During this update, the L2 cache has an ability to track which subsections of the line were speculatively modified. When a cache line is written speculatively, the control logic device 120 or the L2 cache 100 marks which sublines are changed, e.g., by using a flag or dirty bit. If the non-speculative write (i.e., normal write) modifies a subline that has been speculatively written during a local rollback interval, a "write conflict" bit in the L2 cache 100 is set to, for example, high or logic "1", and that interval is not rollbackable. A "write conflict" bit indicates that a normal write modifies speculative data (i.e., assumed data or data computed ahead) and/or that the current interval is not rollbackable. This "write conflict" bit also permits threads to see the latest effects or operations by the MU on a memory system. If no soft error occurs in the current interval, the speculative data can be promoted to non-speculative for a next interval. In addition, although a rollbackable soft error occurs, the control logic device 120 promotes the speculative data to be non-speculative.

In another embodiment, the write conflict condition may cause a state change of the speculation ID to the committed state in addition to or as an alternative to setting a write conflict bit.

In one embodiment, the MU issues an atomic read-modify-write command. When a processor core accesses a main memory location with the read-modify-write command, the L2 cache 100 is read and then modified and the modified contents are stored in the L2 cache. For example, message byte counters (i.e., counters that store the number of bytes in messages in a FIFO), which are initialized by an application, are stored in a main memory. After a payload of a "direct put" packet is written to the main memory, the MU issues the atomic read-modify-write command to an address of the byte counter to decrement the byte counter by the number of payload bytes in the packet. The L2 cache 100 treats this command as both a read and a write command, checking for both read and write conflicts and updating versions.

In one embodiment, in order for the current interval to be rollbackable, certain conditions should be satisfied. One condition is that the MU cannot have started processing any descriptors that were injected into an injection FIFO during the interval. Violations of this "new descriptor injected" condition (i.e., a condition that a new message descriptor was injected into the injection FIFO during the current interval) can be checked by comparing current injection FIFO head pointers with those at the beginning of the interval and/or by tracking how many descriptors are injected during the interval. In a further embodiment, for each injection FIFO, the MU may count the number of descriptors injected.

In a further embodiment, during the current interval, a thread may have received packets from the reception FIFO and advanced the reception FIFO head pointer. Those packets will not be resent by another node, so in order for a local rollback to be successful, the thread should be able to reset the reception FIFO head pointer to what it was at the beginning of the interval so that packets in the reception FIFO can be "re-played". Since the reception FIFO is a circular buffer, and since the head pointer may have been advanced during the interval, it is possible that a newly arrived packet has overwritten a packet in the reception FIFO that should be re-played during the local rollback. In such a situation where an overwriting occurred during a current interval, the interval is not rollbackable. In one embodiment, there is provided messaging software that identifies when such an overwriting occurs. For example, if the head pointer is changed by an "advance_head" macro/inline or function (i.e., a function or code for advancing the head pointer), the "advance_head" function can increment a counter representing the number of bytes in the reception FIFO between an old head pointer (i.e., a head pointer at the beginning of the current interval) and a new head pointer (i.e., a head pointer at the present time). If that counter exceeds a "safe" value (i.e., a threshold value) that was determined at the start of the interval, then a write to a main memory location that invokes the reception FIFO overwriting condition occurs. Such a write may also be invoked via a system call (e.g., a call to a function handled by an Operating System (e.g., Linux™ of a computing node). The safe value can be calculated by reading the reception FIFO head and tail pointers at the beginning of the interval, by knowing a size of the FIFO, and/or by determining how many bytes of packets can be processed before reaching the reception FIFO head pointer.

The barrier(s) or interrupt(s) may be initiated by writing a memory mapped register (not shown) that triggers the barrier or interrupt handler inside a network (i.e., a network connecting processing cores, a main memory, and/or cache memory(s), etc.). If during a local rollback interval, a thread initiates a barrier and a soft error occurs on a node, then the interval is not rollbackable. In one embodiment, there is provided a mechanism that can track such barrier or interrupt, e.g., in a manner similar to the reception FIFO overwriting condition. In an alternative embodiment, hardware (with software cooperation) can set a flag bit in a memory mapped barrier register 140 whenever a write occurs. This flag bit is initialized to 0 at the beginning of the interval. If the special bit is high, the interval cannot be rolled back. A memory mapped barrier register 140 is a register outside a processor core but accessible by the processor core. When values in the memory mapped barrier register changes, the control logic device 120 may cause a barrier or interrupt packet (i.e., packet indicating a barrier or interrupt occurrence) to be injected to the network. There may also be control registers that define how this barrier or interrupt packet is routed and what inputs triggers or creates this packet.

In one embodiment, an application being run uses a messaging software library (i.e., library functions described in the messaging software that is consistent with local rollbacks. The messaging software may monitor the reception FIFO overwriting condition (i.e., a state or condition indicating that an overwriting occurred in the reception FIFO during the current interval), the injection FIFO new descriptor injected condition (i.e., a state or condition that a new message descriptor was injected into the injection FIFO during the current interval), and the initiated interrupt/barrier condition (i.e., a state or condition that the barrier or interrupt is initiated by writing a memory mapped register). In addition, if a memory mapped I/O register 135 (i.e., a register describing status of I/O device(s) or being used to control such device(s)) is written during a local rollback interval, for example, when a FIFO is reconfigured by moving that FIFO, or resizing that FIFO, the interval cannot be rolled back. In a further embodiment, there is provided a mechanism that tracks a write to such memory mapped I/O register(s) and records change bits if condition(s) for local rollback is(are) violated. These change bits have to be cleared at the start of a local rollback interval and checked when soft errors occur.

Thus, at the beginning of a local rollback interval:
1. Threads, run by processing cores of a computing node, set the read and write conflict and overflow bits to 0.
2. Threads store the injection FIFO tail pointers and reception FIFO head pointers, compute and store the safe value and set the reception FIFO overwrite bit (i.e., a bit indicating an overwrite occurred in the reception FIFO during the interval) to 0, set the barrier/interrupt bit (i.e., a bit indicating a barrier or interrupt is initiated, e.g., by writing a memory mapped register, during the interval) to 0, and set the change bits (i.e., bits indicating something has been changed during the interval) to 0.
3. Threads initiate storing of states of their internal and/or external registers.
4. A new speculative ID tag (e.g., a tag "T" (110) in FIG. 1) is generated and used for duration of the interval; and,
5. Threads begin running code in the interval.

If there is no detected soft error at the end of a current interval, the control logic device 120 runs a next interval. If an unconditionally not rollbackable soft error (i.e., non-rollbackable soft error) occurs during the interval, the control logic device 120 or a processor core restarts an operation from a previous checkpoint. If a potentially rollbackable soft error occurs:

1. If the MU is not already stopped, the MU is stopped, thereby preventing new packets from entering a network (i.e., a network to which the MU is connected to) or being received from the network. (Typically, when the MU is stopped, it continues processing any packets currently in progress and then stops.)

2. Rollbackable conditions are checked: the rollback read and write conflict bits, or if the speculation ID is already in committed state, the injection FIFO new descriptor injected condition, the reception FIFO overwrite bits, the barrier/interrupt bit, and the change bits. If the interval is not rollbackable, the control logic device 120 or a processor core restarts an operation from a previous checkpoint. If the interval is rollbackable, proceeding to the next step 3.

3. Processor cores are reinitialized, all or some of the cache lines in the L2 cache 100 are invalidated (without writing back speculative data in the L2 cache 100 to a main memory), and, all or some of the memory mapped registers and thread registers are restored to their values at the start of the current interval. The injection FIFO tail pointers are restored to their original values at the start of the current interval. The reception FIFO head pointers are restored to their original values at the start of the current interval. If the MU was already stopped, the MU is restarted; and, 4. Running of the current interval restarts.

In one embodiment, real-time interrupts such as messages from a control system (e.g., a unit controlling the HPC system), or interrupts initiated by the MU ("MU interrupt") occur. An MU interrupt may occur if a packet with an interrupt bit set high is placed in an injection or reception FIFO, if an amount of free space in a reception FIFO decreases below a threshold, or if an amount of free space in an injection FIFO increases above a threshold. For a (normal) injection FIFO, an interrupt occurs if the amount of free space in the injection FIFO increases above a threshold. For a remote get injection FIFO (i.e., a buffer or queue storing "remote get" message placed by the MU), an interrupt occurs if an amount of free space in the reception FIFO decreases below a threshold.

In one embodiment, the control logic device 120 classifies an interval as non-rollbackable if any of these interrupts occurs. In an alternative embodiment, the control logic device 120 increases a fraction of rollbackable intervals by appropriately handling these interrupts as described below. Control system interrupts or remote get threshold interrupts (i.e., interrupts initiated by the remote get injection FIFO due to an amount of free space lower than a threshold) may trigger software that is not easily rolled back. So if such an interrupt (e.g., control system interrupts and/or remote get threshold interrupt) occurs, the interval is not rollbackable.

All the other interrupts cause the messaging software to run a software routine, e.g., called "advance", that handles all the other interrupts. For example, for the reception FIFO interrupts (i.e., interrupts initiated by the reception FIFO because an amount of free space is below a threshold), the advance may pull packets from the reception FIFO. For the injection FIFO interrupt (i.e., an interrupt occurred because an amount of free space is above a threshold), the advance may inject new message descriptors into a previously full injection FIFO (i.e., a FIFO which was full at some earlier point in time; when the injection FIFO interrupt occurred, the FIFO was no longer full and a message descriptor may be injected). The advance can also be called when such interrupts do not occur, e.g., the advance may be called when an MPI (Messaging Passing Interface) application calls MPI_Wait. MPI refers to a language-independent communication protocol used to program parallel computers and is described in detail in http://www.mpi-forum.org/ or http://www.mcs.anl.gov/research/projects/mpi/. MPI_Wait refers to a function that waits for an MPI application to send or receive to complete its request.

Since the messaging software can correctly deal with asynchronous arrival of messages, the messaging software can process messages whenever they arrive. In a non-limiting example, suppose that an interrupt occurs during a local rollback interval and that the control logic device 120 detects that the interrupt has occurred, e.g., by checking whether the barrier or interrupt bit is set to high ("1"), and that a rollbackable soft error occurs during the interval. In this example, when the interval is restarted, there may be at least as many packets in the reception FIFO as when the interrupt originally occurred. If the control logic device 120 sets hardware interrupt registers (i.e., registers indicating interrupt occurrences) to re-trigger the interrupt, when the interval is restarted, this re-triggering will cause the advance to be called on one or more threads at, or near the beginning of the interval (if the interrupt is masked at the time). In either case, the packets in the reception FIFO will be processed and a condition causing the interrupt will eventually be cleared. If the advance is already in progress, when the interval starts, having interrupt bits set high (i.e., setting the hardware interrupt registers to a logic "1" for example) may cause the advance to be run a second time.

The L2 cache 100 can be configured to run in different modes, including, without limitation, speculative, transactional, rollback and normal (i.e., normal caching function). If there is a mode change during an interval, the interval is not rollbackable.

In one embodiment, there is a single "domain" of tags in the L2 cache 100. In this embodiment, a domain refers to a set of tags. In one embodiment, the software (e.g., Operating System, etc.) or the hardware (e.g., the control logic device, processors, etc.) performs the local rollback when the L2 cache supports a single domain of tags or multiple domains of tags. In the multiple domains of tags, tags are partitioned into different domains. For example, suppose that there are 128 tags that can be divided into up to 8 tag domains with 16 tags per domain. Reads and writes in different tag domains do not affect one another. For example, suppose that there are 16 (application) processor cores per node with 4 different processes each running on a set of 4 processor cores. Each set of cores could comprise a different tag domain. If there is a shared memory region between the 4 processes, which could comprise a fifth tag domain. Reads and writes by the MU are non-speculative (i.e., normal) and may be seen by every domain. Evaluations for local rollback may be satisfied by each tag domain. In particular, if the overflow, read and write conflict bits are set to high in a domain during a local rollback interval, then interval cannot be rolled back if any of the domains indicate non-rollbackable situation (e.g., the overflow bits are high).

Figure 3:
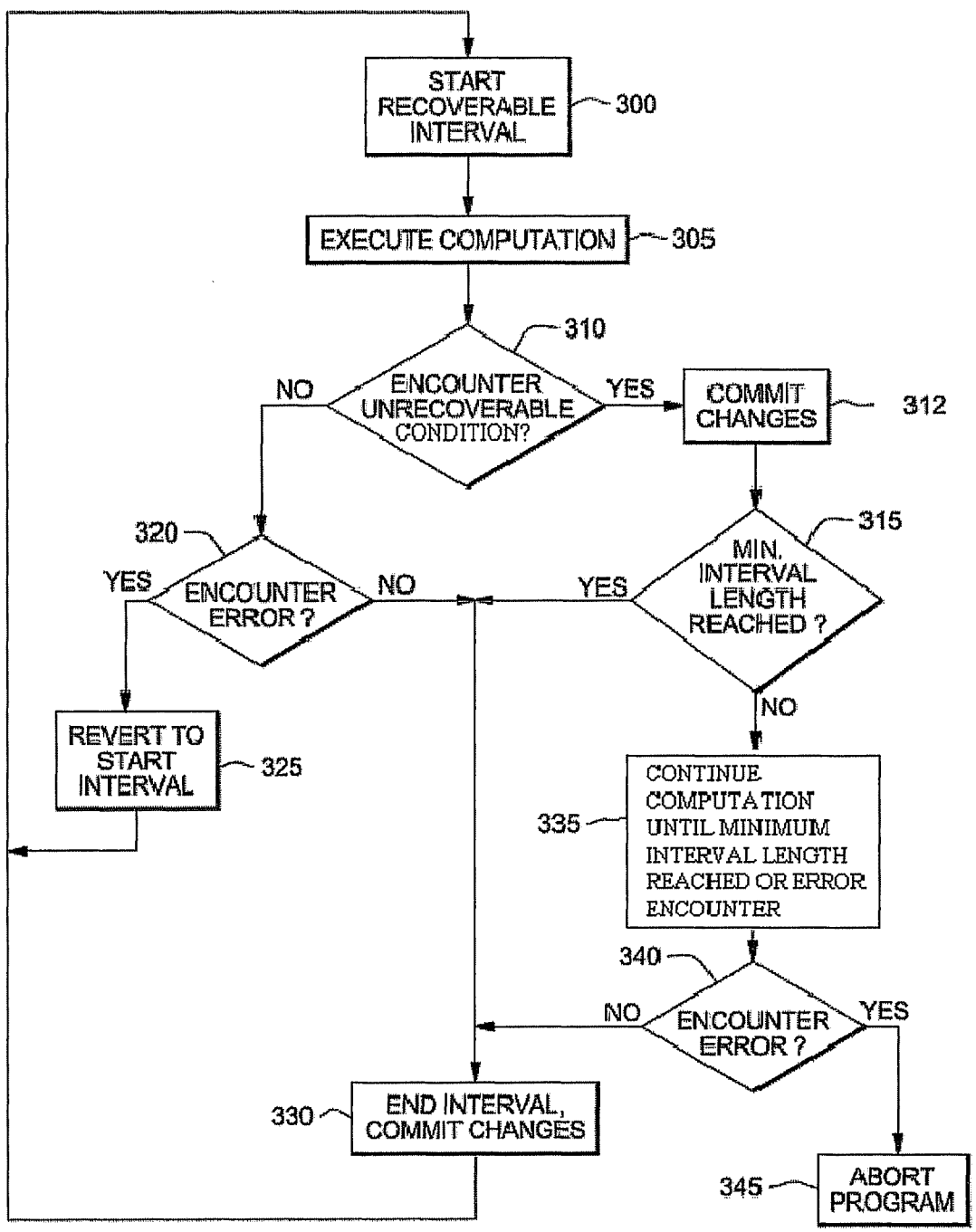
FIG. 3 illustrates a flow chart including method steps for performing a rollback within the L2 cache memory device according to one embodiment.

FIG. 3 illustrates a flow chart including method steps for performing a local rollback (i.e., restart) in a parallel computing system including a plurality of computing nodes according to one embodiment of the present invention. A computing node includes at least one cache memory device and at least one processor. At step 300, the software or hardware starts a current computational interval (e.g., an interval 1 (200) in FIG. 2). At step 305, processors (e.g., CPU 911 in FIG. 7) run(s) at least one instruction in the interval. At step 310, while running the at least one instructions in the interval, the control logic device 120 evaluates whether at least one unrecoverable condition occurs. The at least one unrecoverable condition includes, without limitation, the conflict bit set to high (logic "1")—an occurrence of a read or write conflict during the interval, the overflow bit being set to high—an occurrence of an overflow in the cache memory device during the interval, the barrier or interrupt bit being set to high—an occurrence of a barrier of interrupt during the interval, the reception FIFO overwrite bit being set to high—an occurrence of overwriting a FIFO, the injection FIFO new descriptor injected condition—an occurrence of an injection of data modified during the interval into a FIFO. If the at least one unrecoverable condition does not occur, at step 320, an interrupt handler evaluates whether an error occurs during the local rollback and/or the interval. The error that can be detected in the step 320 may be a rollbackable error (i.e., an error that can be recovered by performing local rollback in the L2 cache 100) because the unrecoverable condition has not occurred during the current interval. A non-rollbackable error is detected, e.g., by utilizing the uncorrectable error detecting capability of a parity bit scheme or ECC (Error Correcting Code). If the rollbackable error occurs, at steps 325 and 300, the control logic device 120 restarts the running of the current interval. Otherwise, at step 330, the software or hardware completes the running of the current interval and instructs the control logic device 120 to commit changes occurred during the current interval. Then, the control goes to the step 300 to run a next local rollback interval in the L2 cache 100.

If, at step 310, an unrecoverable condition occurs during the current interval, at step 312, the control logic device 120 commits changes made before the occurrence of the unrecoverable condition. At step 315, the control logic device 315 evaluates whether a minimum interval length is reached. The minimum interval length refers to the least number of instructions or the least amount of time that the control logic device 120 spends to run a local rollback interval. If the minimum interval length is reached, at step 330, the software or hardware ends the running of the current interval and instructs the control logic device 120 to commit changes (in states of the processor) occurred during the minimum interval length. Then, the control returns to the step 300 to run a next local rollback interval in the L2 cache 100. Otherwise, if the minimum interval length is not reached, at step 335, the software or hardware continues the running of the current interval until the minimum interval length is reached.

Continuing to step 340, while running the current interval before reaching the minimum interval length, whether an error occurred or not can be detected. The error that can be detected in step 340 may be non-recoverable soft error because an unrecoverable condition has been occurred during the current interval. If a non-recoverable error (i.e., an error that cannot be recovered by restarting the current interval) has not occurred until the minimum interval length is reached, at step 330, the software or hardware ends the running of the current interval upon reaching the minimum interval length and commits changes occurred during the minimum interval length. Then, the control returns to the step 300 to run a next local rollback interval. Otherwise, if a non-recoverable error occurs before reaching the minimum interval length, at step 345, the software or hardware stops running the current interval even though the minimum interval length is not reached and the control is aborted 345.

Figure 4:
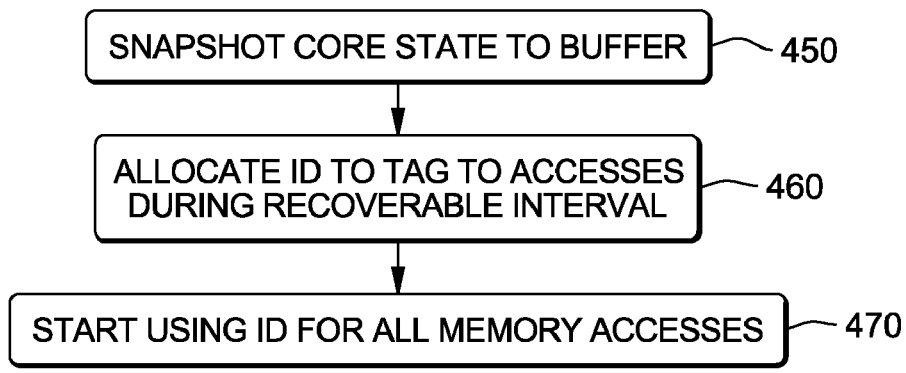
FIG. 4 illustrates a flow chart detailing a method step described in FIG. 3 according to a further embodiment.

FIG. 4 illustrates a flow chart detailing the step 300 described in FIG. 3 according to a further embodiment of the present invention. At step 450, at the start of the current interval, the software or hardware stores states (e.g., register contents, program counter values, etc.) of a computing node's processor cores, e.g., in a buffer. At steps 460-470, the control logic device 120 allocates and uses the newest generation ID tag (e.g., the tag "T" (110) in FIG. 1) to versions of data created or accessed during the current interval.

Figure 5:
FIG. 5 illustrates a flow chart or method step detailing a method step described in FIG. 3 according to a further embodiment.

FIG. 5 illustrates a method step supplementing the steps 312 and/or 330 described in FIG. 3 according to a further embodiment of the present invention. After the control logic device 120 runs the step 312 or step 330 in FIG. 5, the software or hardware may run a step 500 in FIG. 7. At the step 500, the software or the processor(s) instructs the control logic device 120 to declare all or some of changes associated with the newest generation ID tag as permanent changes. In other words, at step 500, the control logic device 120 makes tentative changes in the state of the memory that occur in the current interval as permanent changes.

Figure 6:
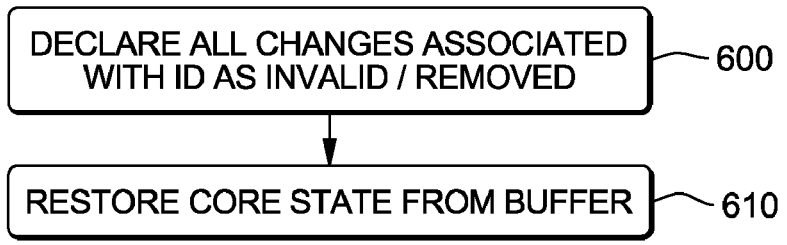
FIG. 6 illustrates a flow chart detailing a method step described in FIG. 3 according to a further embodiment.

FIG. 6 illustrates a flow chart detailing the step 325 described in FIG. 3 according to a further embodiment of the present invention. At step 600, the software or processor(s) instructs the control logic device 120 to declare all or some of changes associated with the newest generation ID tag as invalid. Consequently, the control logic device 120 discards and/or invalidates all or some of changes associated with the newest generation ID tag. Then, at step 610, the control logic device 120 restores the stored states of the process cores from the buffer.

In one embodiment, at least one processor core performs method steps described in FIGS. 3-6. In another embodiment, the control logic device 120 performs method steps described in FIGS. 3-6.

In one embodiment, the method steps in FIGS. 3-6 and/or the control logic device 120 are implemented in hardware or reconfigurable hardware, e.g., FPGA (Field Programmable Gate Array) or CPLD (Complex Programmable Control logic device Device), using a hardware description language (Verilog, VHDL, Handel-C, System C, etc.). In another embodiment, the method steps in FIGS. 3-6 and/or the control logic device 120 are implemented in a semiconductor chip, e.g., ASIC (Application-Specific Integrated Circuit), using a semi-custom design methodology, i.e., designing a semiconductor chip using standard cells and a hardware description language. Thus, the hardware, reconfigurable hardware or the semiconductor chip operates the method steps described in FIGS. 3-6.

Figure 7:
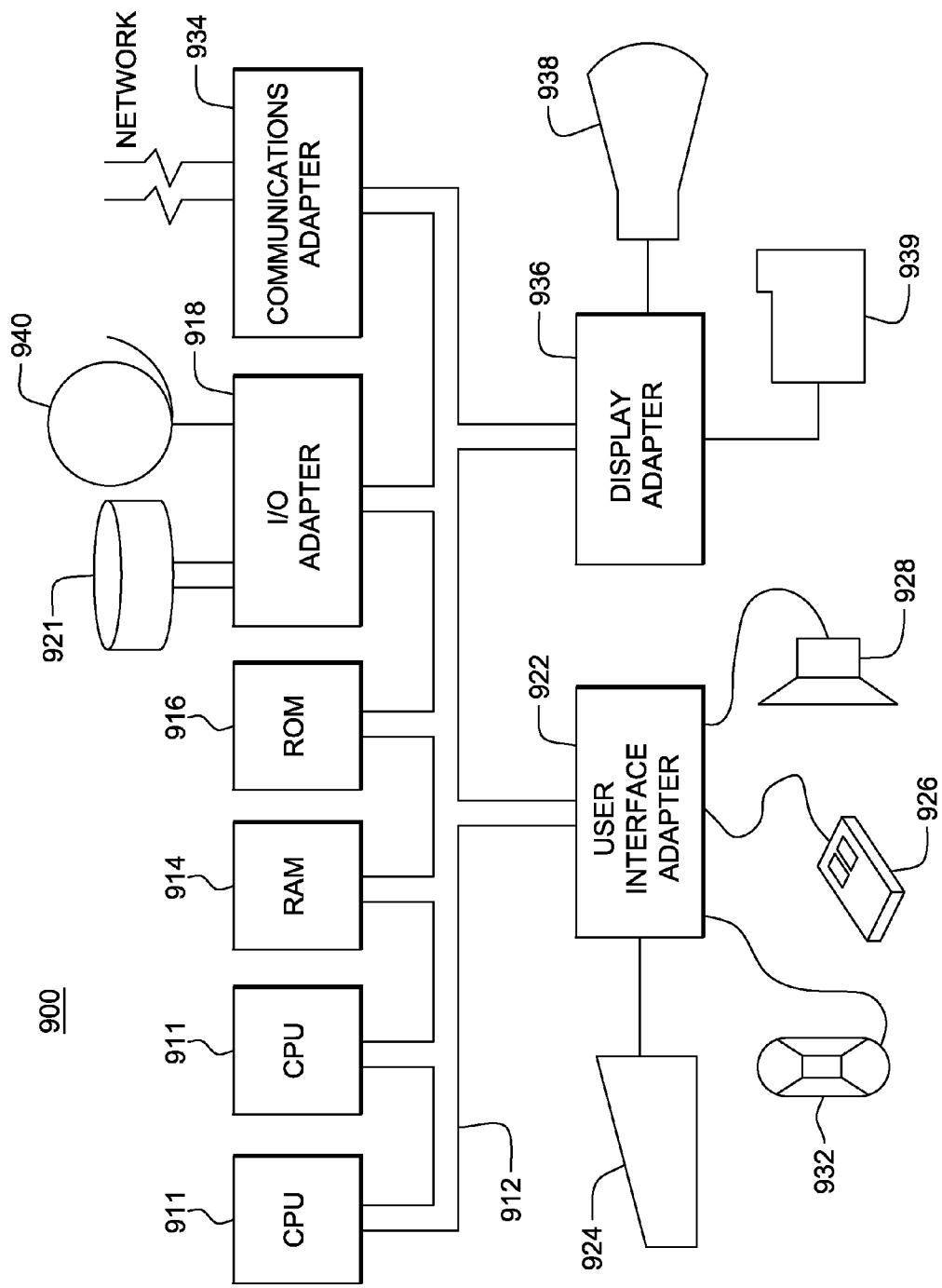
FIG. 7 illustrates an exemplary hardware configuration running the method steps described in FIGS. 3-6 according to one embodiment.

FIG. 7 illustrates an exemplary hardware configuration of a computing system 900 running and/or implementing the method steps in FIGS. 3-6 and/or the control logic device 120 in FIG. 1. The hardware configuration preferably has at least one processor or central processing unit (CPU) 911. The CPUs 911 are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 926, speaker 928, microphone 932, and/or other user interface device to the bus 912), a communication adapter 934 for connecting the system 900 to a data processing network, the Internet, an Intranet, a local area network (LAN), etc., and a display adapter 936 for connecting the bus 912 to a display device 938 and/or printer 939 (e.g., a digital printer of the like).

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/ or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions run by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more of functions of this invention. The present invention may include a computer program product for performing one or more of functions of this invention. The computer program product comprises a storage medium (e.g., a disk drive, optical disc, solid-state drive, etc.) readable by a processing circuit (e.g., a CPU or processor core) and storing instructions run by the processing circuit for performing the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented method for performing a local rollback in a parallel computing system, the computing system including at least one computing node, the computing node including a processor and a cache memory device, the method comprising:

determining a local rollback interval in an individual computing node of the computing system;

storing state information of a processor in the individual computing node;

running at least one instruction in the local rollback interval in the individual computing node;

associating an ID tag with versions of data stored in the cache memory device and using the ID tag to distinguish the versions of data stored in the cache memory device while running the instruction during the local rollback interval, the versions of data stored in the cache memory device during the local rollback interval including: speculative version of data and non-speculative version of data;

evaluating whether an unrecoverable condition occurs while running the at least one instruction during the local rollback interval;

checking whether an error occurs in the individual computing node during the local rollback interval;

upon the occurrence of the error and no occurrence of the unrecoverable condition, restoring the stored state information of the processor in the individual computing node, invalidating the speculative data; and restarting the local rollback interval in the individual computing node in response to determining that the error occurs in the individual computing node and that the unrecoverable condition does not occur in the individual computing node during the local rollback interval, wherein the restarting the local rollback interval in the individual computing node avoids restoring data from a previous checkpoint;

evaluating whether a minimum interval length is reached in response to determining that the unrecoverable condition occurs, the minimum interval length referring to a least number of instructions or a least amount of time to run the local rollback interval;

continuing a running of the local rollback interval until the minimum interval length is reached in response to determining that the minimum interval length is not reached; and committing one or more changes made before the occurrence of the unrecoverable condition in response to determining that the unrecoverable condition occurs and the minimum interval length is reached.

2. The method according to claim 1, wherein the unrecoverable condition includes one or more of: an occurrence of a read or write conflict during the interval, an occurrence of an overflow in the cache memory device during the interval, an occurrence of a barrier or interrupt during the interval, an occurrence of overwriting a FIFO, an occurrence of an injection of data modified during the interval into a FIFO.

3. The method according to claim 1, further comprising:
  detecting a non-rollbackable error, the non-rollbackable error referring to an error that cannot be recovered by the restarting the local rollback interval.

4. The method according to claim 3, wherein the non-rollbackable error is detected by a parity bit scheme or ECC (Error Correction Code).

5. The method according to claim 1, further comprising:
  committing changes in state of the cache memory device that occurs during the interval in response to determining that the error did not occur during the interval, wherein the committing makes tentative changes in the states of the cache memory device as permanent changes.

6. The method according to claim 1, wherein the continuing comprises:
  evaluating whether a non-recoverable error occurs during the continuing, the non-recoverable error referring to a non-rollbackable error; and
  terminating the interval in response to determining that the non-recoverable error occurred during the interval.

7. The method according to claim 1, wherein the restarting comprises:
  discarding or invalidating changes associated with the ID tag; and
  restoring the stored state information of the processor.

8. A parallel computing system for performing a local rollback, the system comprising:
  a computing node comprising a processor and a cache memory device;
  the computing node performing steps of:
    determining a local rollback interval in an individual computing node of the computing system;
    storing state information of a processor in the individual computing node;
    running at least one instruction in the local rollback interval in the individual computing node;
    associating an ID tag with versions of data stored in the cache memory device and using the ID tag to distinguish the versions of data stored in the cache memory device while running the instruction during the local rollback interval, the versions of data stored in the cache memory device during the local rollback interval including: speculative version of data and non-speculative version of data;
    evaluating whether an unrecoverable condition occurs while running the at least one instruction during the local rollback interval;
    checking whether an error occurs in the individual computing node during the local rollback interval;
    upon the occurrence of the error and no occurrence of the unrecoverable condition, restoring the stored state information of the processor in the individual computing node, and invalidating the speculative data; and
    restarting the local rollback interval in the individual computing node in response to determining that the error occurs in the individual computing node and that the unrecoverable condition does not occur in the individual computing node during the local rollback interval, wherein the restarting the local rollback interval in the individual computing node avoids restoring data from a previous checkpoint;
    evaluating whether a minimum interval length is reached in response to determining that the unrecoverable condition occurs, the minimum interval length referring to a least number of instructions or a least amount of time to run the local rollback interval;
    continuing a running of the local rollback interval until the minimum interval length is reached in response to determining that the minimum interval length is not reached; and
    committing one or more changes made before the occurrence of the unrecoverable condition in response to determining that the unrecoverable condition occurs and the minimum interval length is reached.

9. The system according to claim 8, wherein the unrecoverable condition includes one or more of: an occurrence of a read or write conflict during the interval, an occurrence of an overflow in the cache memory device during the interval, an occurrence of a barrier or interrupt during the interval, an occurrence of overwriting a FIFO, an occurrence of an injection of data modified during the interval into a FIFO.

10. The system according to claim 8, the computing node further performs step of:
  detecting a non-rollbackable error, the non-rollbackable error referring to an error that cannot be recovered by the restarting the local rollback interval.

11. The system according to claim 10, wherein the non-rollbackable error is detected by a parity bit scheme or ECC (Error Correction Code).

12. The system according to claim 8, the computing node further performs step of:
  committing changes in state of the cache memory device that occur during the interval in response to determining that the error did not occur during the interval, the committing makes tentative changes in the states of the cache memory device as permanent changes.

13. The system according to claim 8, wherein the continuing comprises:
  evaluating whether a non-recoverable error occurs during the continuing, the non-recoverable error referring to a non-rollbackable error; and
  stopping the running of the interval in response to determining that the non-recoverable error is occurred during the interval.

14. The method according to claim 8, wherein the restarting comprises:
  discarding or invalidating changes associated with the ID tag; and
  restoring the stored state information of the processor.

15. A computer program product for performing a local rollback in a parallel computing system, the computer program product comprising a non-transitory storage medium readable by a processing circuit and storing instructions run by the processing circuit for performing a method according to claim 1.

16. The method according to claim 1, further comprising:
  operating the cache memory device in one or more of: a speculative mode, a transactional mode, a rollback mode, and a normal mode, wherein
  the cache memory device is operated in the speculative mode when the individual computing node computes the instruction ahead of time rather than computes the instruction as written in a sequential program order;
  the cache memory device is operated in the transactional mode when the individual computing node controls a sharing and concurrency of the cache memory device;
  the cache memory device is operated in the rollback mode when the individual computing node performs the local rollback, the performing the local rollback including one or more of: resetting the individual computing node, restoring states of the individual computing node from a start of a local rollback interval, invalidating changes made since the start of the local rollback interval, and restarting the local rollback interval; and the cache memory device is operated in the normal mode when the individual computing node reads or stores data from the cache memory device.

* * * * *